(12) United States Patent
Khandekar et al.

(10) Patent No.: US 8,675,537 B2
(45) Date of Patent: Mar. 18, 2014

(54) METHOD AND APPARATUS FOR USING MBSFN SUBFRAMES TO SEND UNICAST INFORMATION

(75) Inventors: Aamod D. Khandekar, San Diego, CA (US); Juan Montojo, San Diego, CA (US); Naga Bhushan, San Diego, CA (US); Ravi Palanki, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 999 days.

(21) Appl. No.: 12/417,364

(22) Filed: Apr. 2, 2009

(65) Prior Publication Data

US 2009/0252077 A1    Oct. 8, 2009

Related U.S. Application Data

(60) Provisional application No. 61/043,104, filed on Apr. 7, 2008.

(51) Int. Cl.
*H04J 3/16* (2006.01)
*H04B 7/216* (2006.01)

(52) U.S. Cl.
USPC ............ 370/312; 370/335; 370/465; 455/562

(58) Field of Classification Search
USPC .......... 370/252–338, 445–473; 375/260–299; 455/422–450, 456–562
See application file for complete search history.

(56) References Cited

U.S. PATENT DOCUMENTS

| | | | |
|---|---|---|---|
| 5,825,758 A | 10/1998 | Heikkinen et al. | |
| 5,828,962 A | 10/1998 | Ho-A-Chuck | |

(Continued)

FOREIGN PATENT DOCUMENTS

| | | | |
|---|---|---|---|
| CN | 1219081 A | 6/1999 | |
| CN | 1235745 | 11/1999 | |

(Continued)

OTHER PUBLICATIONS

3GPP: "3rd Generation Partnership Project; Technical Specification Group Radio Access network; Evolved Universal Terrestrial Radio access (E-UTRA); Physical channels and Modulation (Release 8)" Internet, Citation, Mar. 2008, sections 6-6.2.4. and 6.10 to 6.10.3.2 , pp. 1-65, XP002537575.

(Continued)

*Primary Examiner* — Man Phan
(74) *Attorney, Agent, or Firm* — John J. Ketchum

(57) ABSTRACT

Techniques for sending information in a wireless network are described. The network may support (i) regular subframes used to send unicast information and (ii) multicast/broadcast single frequency network (MBSFN) subframes used to send broadcast information and having lower overhead than the regular subframes. In an aspect, MBSFN subframes may be used to mitigate interference. A first base station may cause high interference to stations (e.g., UEs) served by a second base station. The first base station may reserve a subframe for the second base station, send system information conveying the reserved subframe as an MBSFN subframe to its stations, and transmit in a first part of the reserved subframe in accordance with an MBSFN subframe format. The second base station may skip the first part and may send unicast information to its stations in the remaining part of the reserved subframe. In another aspect, MBSFN subframes may be used to support additional base station capabilities.

49 Claims, 13 Drawing Sheets

(56) References Cited

U.S. PATENT DOCUMENTS

| | | | |
|---|---|---|---|
| 5,867,478 A | 2/1999 | Baum et al. | |
| 5,920,862 A | 7/1999 | Waters | |
| 5,940,765 A | 8/1999 | Haartsen | |
| 5,970,414 A | 10/1999 | Bi et al. | |
| 6,337,988 B1 | 1/2002 | Agin et al. | |
| 6,473,619 B1 | 10/2002 | Kong et al. | |
| 6,498,932 B1 | 12/2002 | Silventoinen et al. | |
| 6,728,550 B1 | 4/2004 | Boehnke et al. | |
| 6,985,498 B2 | 1/2006 | Laroia et al. | |
| 7,302,276 B2 | 11/2007 | Bernhardsson et al. | |
| 7,426,395 B2 | 9/2008 | Stephens | |
| 7,450,559 B2 | 11/2008 | Schotten et al. | |
| 7,453,912 B2 | 11/2008 | Laroia et al. | |
| 7,522,919 B2 | 4/2009 | Yoon et al. | |
| 7,555,300 B2 | 6/2009 | Scheinert et al. | |
| 7,574,224 B2 | 8/2009 | Lane et al. | |
| 7,657,277 B2 | 2/2010 | Montojo et al. | |
| 7,751,510 B2 | 7/2010 | Budianu et al. | |
| 7,796,639 B2 * | 9/2010 | Buckley et al. | 370/465 |
| 7,830,907 B1 | 11/2010 | Petranovich et al. | |
| 7,920,494 B2 * | 4/2011 | Stewart et al. | 370/310 |
| 8,077,649 B2 * | 12/2011 | Cai | 370/312 |
| 8,077,801 B2 * | 12/2011 | Malladi | 375/299 |
| 8,300,658 B2 * | 10/2012 | Buckley et al. | 370/465 |
| 2001/0001609 A1 | 5/2001 | Mikuni et al. | |
| 2001/0014608 A1 | 8/2001 | Backstrom et al. | |
| 2002/0168994 A1 | 11/2002 | Terry et al. | |
| 2003/0101404 A1 | 5/2003 | Zhao et al. | |
| 2004/0022176 A1 | 2/2004 | Hashimoto et al. | |
| 2004/0190482 A1 | 9/2004 | Baum et al. | |
| 2004/0198235 A1 | 10/2004 | Sano | |
| 2004/0203734 A1 | 10/2004 | Ishii | |
| 2005/0163070 A1 | 7/2005 | Farnham et al. | |
| 2005/0254555 A1 | 11/2005 | Teague et al. | |
| 2005/0277425 A1 | 12/2005 | Niemela et al. | |
| 2006/0045050 A1 | 3/2006 | Floros et al. | |
| 2006/0111137 A1 | 5/2006 | Mori et al. | |
| 2006/0286995 A1 | 12/2006 | Onggosanusi et al. | |
| 2007/0021075 A1 | 1/2007 | Nakao | |
| 2007/0036066 A1 | 2/2007 | Thomas et al. | |
| 2007/0047483 A1 | 3/2007 | Khan | |
| 2007/0070967 A1 | 3/2007 | Yang et al. | |
| 2007/0082619 A1 | 4/2007 | Zhang et al. | |
| 2007/0104151 A1 * | 5/2007 | Papasakellariou et al. | 370/335 |
| 2007/0167160 A1 | 7/2007 | Asanuma et al. | |
| 2007/0189244 A1 | 8/2007 | Del et al. | |
| 2007/0195899 A1 | 8/2007 | Bhushan et al. | |
| 2007/0242618 A1 | 10/2007 | Sakoda et al. | |
| 2007/0248113 A1 * | 10/2007 | Ko et al. | 370/436 |
| 2007/0253442 A1 | 11/2007 | Yu et al. | |
| 2007/0275746 A1 | 11/2007 | Bitran | |
| 2008/0031307 A1 | 2/2008 | Fukuoka et al. | |
| 2008/0032744 A1 * | 2/2008 | Khan et al. | 455/562.1 |
| 2008/0049690 A1 | 2/2008 | Kuchibhotla et al. | |
| 2008/0056201 A1 | 3/2008 | Bennett | |
| 2008/0081598 A1 | 4/2008 | Chandra et al. | |
| 2008/0095133 A1 | 4/2008 | Kodo et al. | |
| 2008/0130612 A1 | 6/2008 | Gorokhov et al. | |
| 2008/0132263 A1 * | 6/2008 | Yu et al. | 455/515 |
| 2008/0144612 A1 | 6/2008 | Honkasalo et al. | |
| 2008/0232396 A1 * | 9/2008 | Buckley et al. | 370/465 |
| 2009/0052403 A1 | 2/2009 | Hokao | |
| 2009/0080382 A1 | 3/2009 | Chen et al. | |
| 2009/0097447 A1 * | 4/2009 | Han et al. | 370/330 |
| 2009/0129268 A1 | 5/2009 | Lin et al. | |
| 2009/0130979 A1 | 5/2009 | Bhushan et al. | |
| 2009/0131061 A1 | 5/2009 | Palanki et al. | |
| 2009/0132674 A1 | 5/2009 | Horn et al. | |
| 2009/0132675 A1 | 5/2009 | Horn et al. | |
| 2009/0185632 A1 | 7/2009 | Cai et al. | |
| 2009/0199069 A1 | 8/2009 | Palanki et al. | |
| 2009/0219838 A1 | 9/2009 | Jia et al. | |
| 2009/0219839 A1 | 9/2009 | Zhao et al. | |
| 2009/0257388 A1 | 10/2009 | Khandekar et al. | |
| 2009/0316654 A1 | 12/2009 | Prakash et al. | |
| 2009/0316655 A1 | 12/2009 | Prakash et al. | |
| 2010/0009687 A1 * | 1/2010 | Koivisto et al. | 455/450 |
| 2010/0014286 A1 * | 1/2010 | Yoneda et al. | 362/231 |
| 2010/0040019 A1 | 2/2010 | Tinnakornsrisuphap et al. | |
| 2010/0040038 A1 | 2/2010 | Tinnakornsrisuphap et al. | |
| 2010/0062783 A1 * | 3/2010 | Luo et al. | 455/450 |
| 2010/0091702 A1 | 4/2010 | Luo et al. | |
| 2010/0097972 A1 * | 4/2010 | Parkvall et al. | 370/312 |
| 2010/0201188 A1 * | 8/2010 | Robbins | 307/1 |
| 2010/0329171 A1 * | 12/2010 | Kuo et al. | 370/312 |
| 2011/0103286 A1 * | 5/2011 | Montojo et al. | 370/312 |
| 2011/0103338 A1 * | 5/2011 | Astely et al. | 370/329 |
| 2011/0235744 A1 | 9/2011 | Ketchum et al. | |

FOREIGN PATENT DOCUMENTS

| | | |
|---|---|---|
| CN | 1770892 A | 5/2006 |
| CN | 1909417 A | 2/2007 |
| CN | 101094433 A | 12/2007 |
| EP | 0917305 A2 | 5/1999 |
| EP | 1061705 A1 | 12/2000 |
| EP | 1420551 A2 | 5/2004 |
| EP | 1440532 | 7/2004 |
| EP | 1501328 A2 | 1/2005 |
| EP | 1679814 A2 | 7/2006 |
| JP | 11098571 A | 4/1999 |
| JP | 2004260692 A | 9/2004 |
| JP | 2004274745 A | 9/2004 |
| JP | 2005510902 | 4/2005 |
| JP | 2006505978 A | 2/2006 |
| JP | 2006135673 A | 5/2006 |
| JP | 2007097173 A | 4/2007 |
| JP | 2007129726 A | 5/2007 |
| JP | 2007515106 A | 6/2007 |
| JP | 2007221745 A | 8/2007 |
| JP | 2007527678 A | 9/2007 |
| JP | 2007533255 | 11/2007 |
| JP | 2007335913 A | 12/2007 |
| JP | 2007538462 T | 12/2007 |
| JP | 2008053858 A | 3/2008 |
| JP | 2008219637 A | 9/2008 |
| JP | 2008288736 A | 11/2008 |
| JP | 2008547269 A | 12/2008 |
| JP | 2009510975 A | 3/2009 |
| JP | 2009538584 A | 11/2009 |
| KR | 20070009707 A | 1/2007 |
| RU | 2150176 | 5/2000 |
| RU | 2165678 C2 | 4/2001 |
| RU | 2002129901 A | 3/2004 |
| RU | 2262811 | 10/2005 |
| RU | 2287902 C2 | 11/2006 |
| RU | 2307481 C2 | 9/2007 |
| TW | 200404467 | 3/2004 |
| TW | 200404472 | 3/2004 |
| WO | WO9616524 | 5/1996 |
| WO | 9809469 A1 | 3/1998 |
| WO | WO135692 A1 | 5/2001 |
| WO | WO0178440 | 10/2001 |
| WO | WO03039057 | 5/2003 |
| WO | 03101141 A1 | 12/2003 |
| WO | WO2004019537 A2 | 3/2004 |
| WO | 2004043096 A2 | 5/2004 |
| WO | 2005088873 A1 | 9/2005 |
| WO | WO2005109657 A1 | 11/2005 |
| WO | WO2005117283 A2 | 12/2005 |
| WO | WO2006001143 A1 | 1/2006 |
| WO | WO2006007318 A1 | 1/2006 |
| WO | WO2006020032 | 2/2006 |
| WO | WO2006038694 A1 | 4/2006 |
| WO | WO2006043588 A1 | 4/2006 |
| WO | WO2006086437 A1 | 8/2006 |
| WO | WO2006106676 A1 | 10/2006 |
| WO | WO2006134032 | 12/2006 |
| WO | WO2006138336 A1 | 12/2006 |
| WO | WO2007024853 | 3/2007 |
| WO | WO2007024895 | 3/2007 |
| WO | WO2007025308 | 3/2007 |
| WO | WO2007044173 A2 | 4/2007 |
| WO | WO2007044281 | 4/2007 |

(56) References Cited

FOREIGN PATENT DOCUMENTS

| WO | WO2007081130 A1 | 7/2007 |
| WO | WO2007091245 A2 | 8/2007 |
| WO | WO2007106980 | 9/2007 |
| WO | 2007119452 A1 | 10/2007 |
| WO | WO2007137201 | 11/2007 |
| WO | WO2007137920 A1 | 12/2007 |
| WO | 2008023928 A2 | 2/2008 |
| WO | WO2008049136 | 4/2008 |
| WO | WO2008086149 | 7/2008 |

OTHER PUBLICATIONS

Hooli K et al: "Flexible Spectrum Use between WINNER Radio Access Networks" Proc. IST Mobile & Wireless, Myconos (GREECE),, Jun. 4, 2006, pp. 1-5, XP003020776 p. 1, paragraph 1, p. 2, paragraph 2.

International Search Report and Written Opinion—PCT/US2009/039683, International Search Authority—European Patent Office—Nov. 9, 2009.

LG Electronics: "Multiplexing of MBMS and unicast transmission in E-UTRA downlink; R1-060054" 3GPP TSG-RAN WG1 Meeting AD HOC LTE, vol. R1-060054, Jan. 23, 2006, pp. 1-5, XP003016637.

NTT Docomo et al., "L1/L2 Control Channel Structure for E-UTRA Downlink," 3GPP TSG RAN WG1 Meeting 45, R1-061181, Shanghai, China, May 8-12, 2006, pp. 1-17.

NTT Docomo et al., "PUCCH Structure Considering Sounding RS Transmission in E-UTRA Uplink," 3GPP TSG RAN WG1 Meeting #50, R1-073700, Athens, Greece, Aug. 20-24, 2007, pp. 1-3.

Qualcomm Europe: "Neighbor Cell Search—Analysis and Simulations" 3GPP Draft; R1-063432, 3RD Generation Partnership Project (36PP), Mobile Competence Centre ; 650, Route Des Lucioles ; F-06921 Sophia-Antipolis Cedex ; France, no. Riga, Latvia; 20061106, Nov. 1, 2006, XP050103869 paragraph [04.1] —paragraph [04.3].

"High Performance Space Frequency Interleaved MIMO-OFDM Eigen mode Transmission systems," Vehicular Technology Conferences, 2006, VTC-2006 IEEE 64th, Sep. 25-28, 2006, pp. 1-5.

Ravi Palanki "Update on out-of-band pilot design for LBC FDD," ftp://ftp.3gpo2.org/TSGC/Working/2006/2006-12-Mau/TSG-C-2006-12-Maui/WG3/C30-20061204-045_QCOM_update_on_out-of-band_pilot_design_for_LBC_FDD.pdf.Dec. 2006. 20061204-045_QCOM_update_on_out-of-band_pilot_design_for_LBC_FDD.pdf.December 2006.

3rd Generation Partnership Project; Technical Specification Group Radio Access Network; Multiplexing and channel coding (FDD); 3GPP TS 25.212 V5.10.0 (Jun. 2005) Release 5.

NEC Group: "Some issues related to MBSFN sub-frame structure", R1-071501, RAN WG1 meeting 48bis, 30.03.2007,http://www.3gpp.org/ftp/tsg_ran/WG1_RL1/TSGR1_48b/Docs/R1-071501.zip.

European Search Report—EP13155017—Search Authority—Munich—Jun. 5, 2013.

LG Electronics: "DL PDCCH/PCFICH/RS transmission in MBSFN subframe," R1-073477, 3GPP TSG RAN WG1 #50,7.2.3, Aug. 20-24, 2007, pp. 2.

Nokia et al: "Issues regarding MBSFN subframes", 3GPP Draft; R1-074863, 3rd Generation Partnership Project (3GPP), Mobile Competence Centre ; 658, Route Des Lucioles , F-06921 Sophia-Antipolis Cedex; France, vol. RAN WG1, no. Korea; 20071030, Oct. 30, 2007, XP050108319.

Taiwan Search Report—TW098111565—TIPO—Mar. 20, 2013.

\* cited by examiner

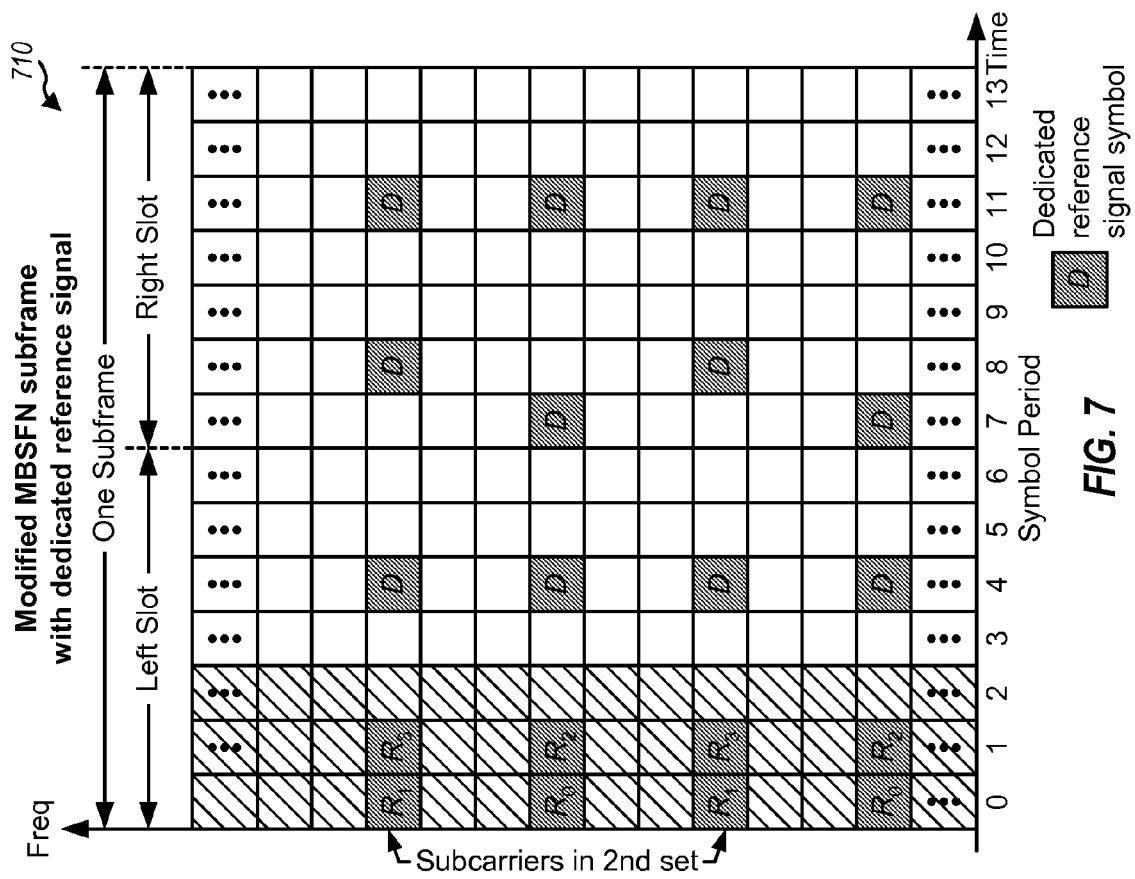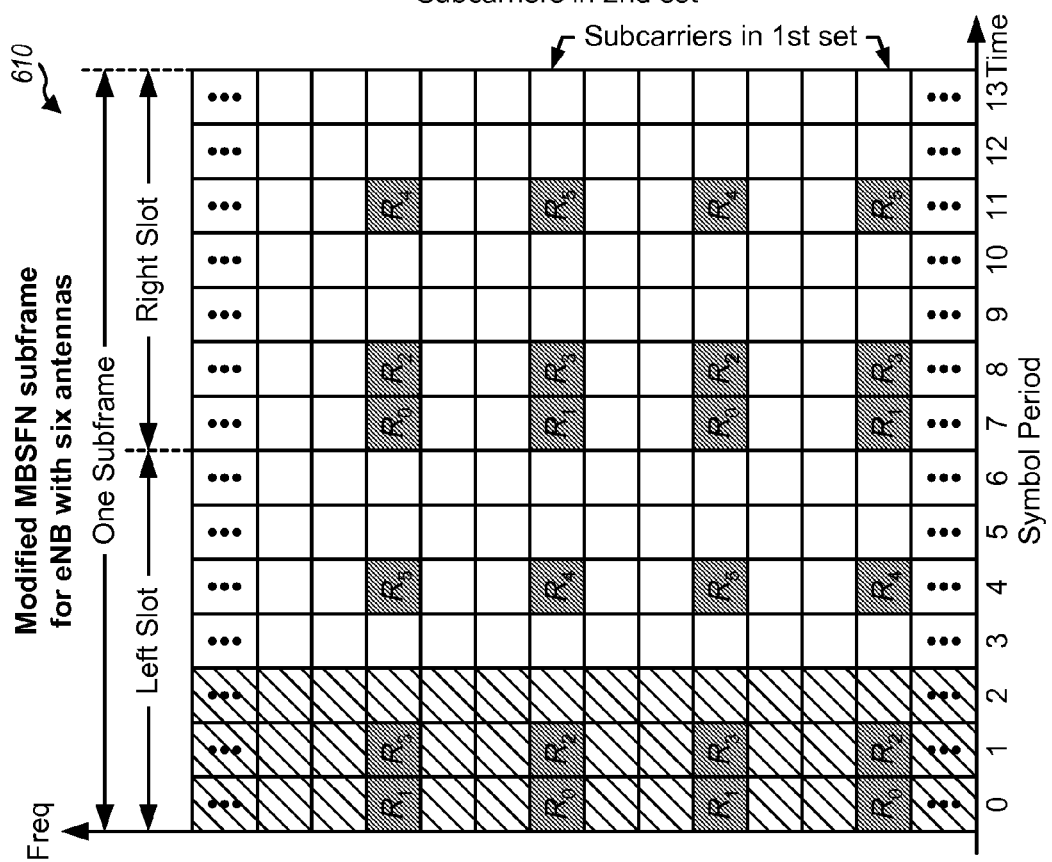

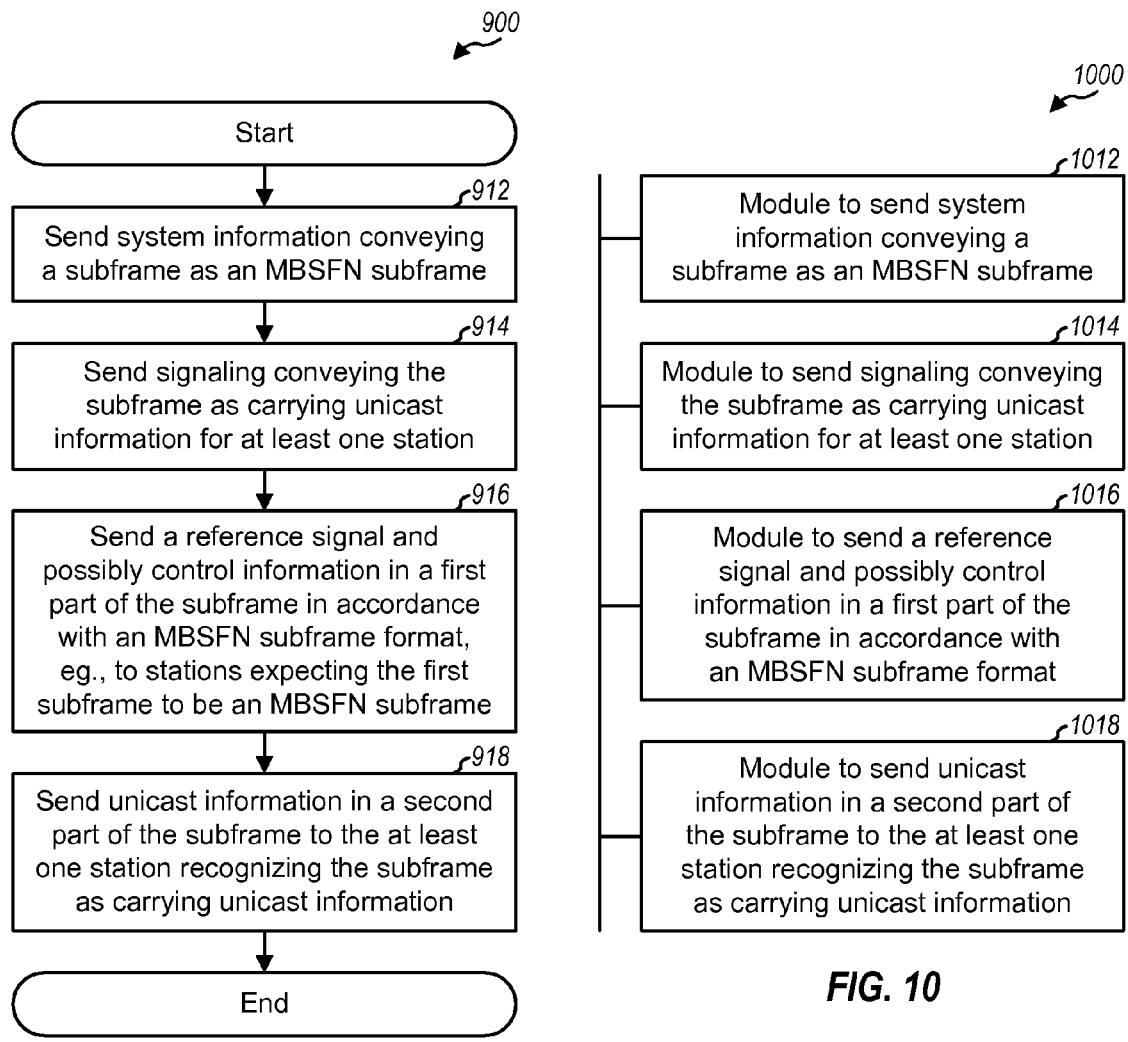

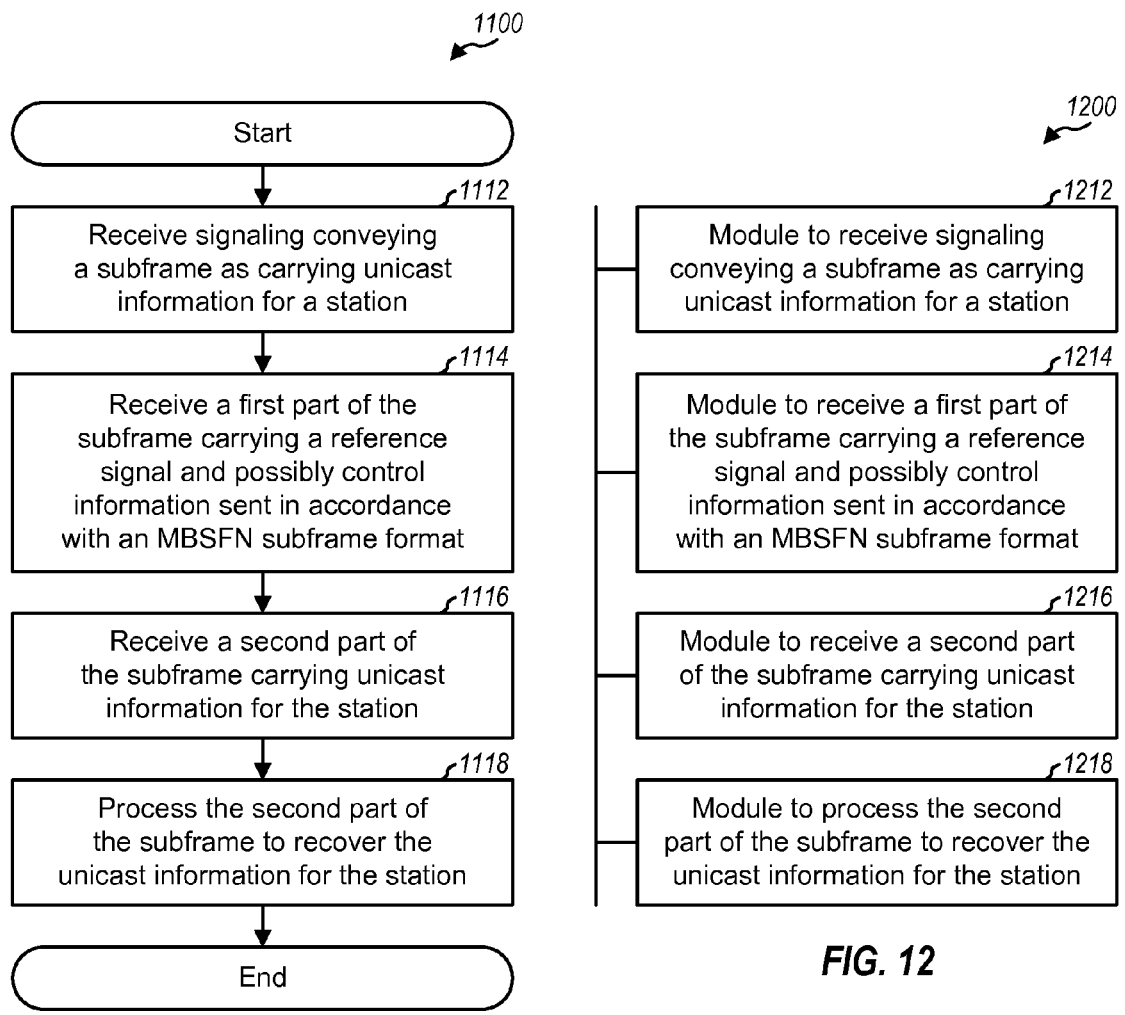

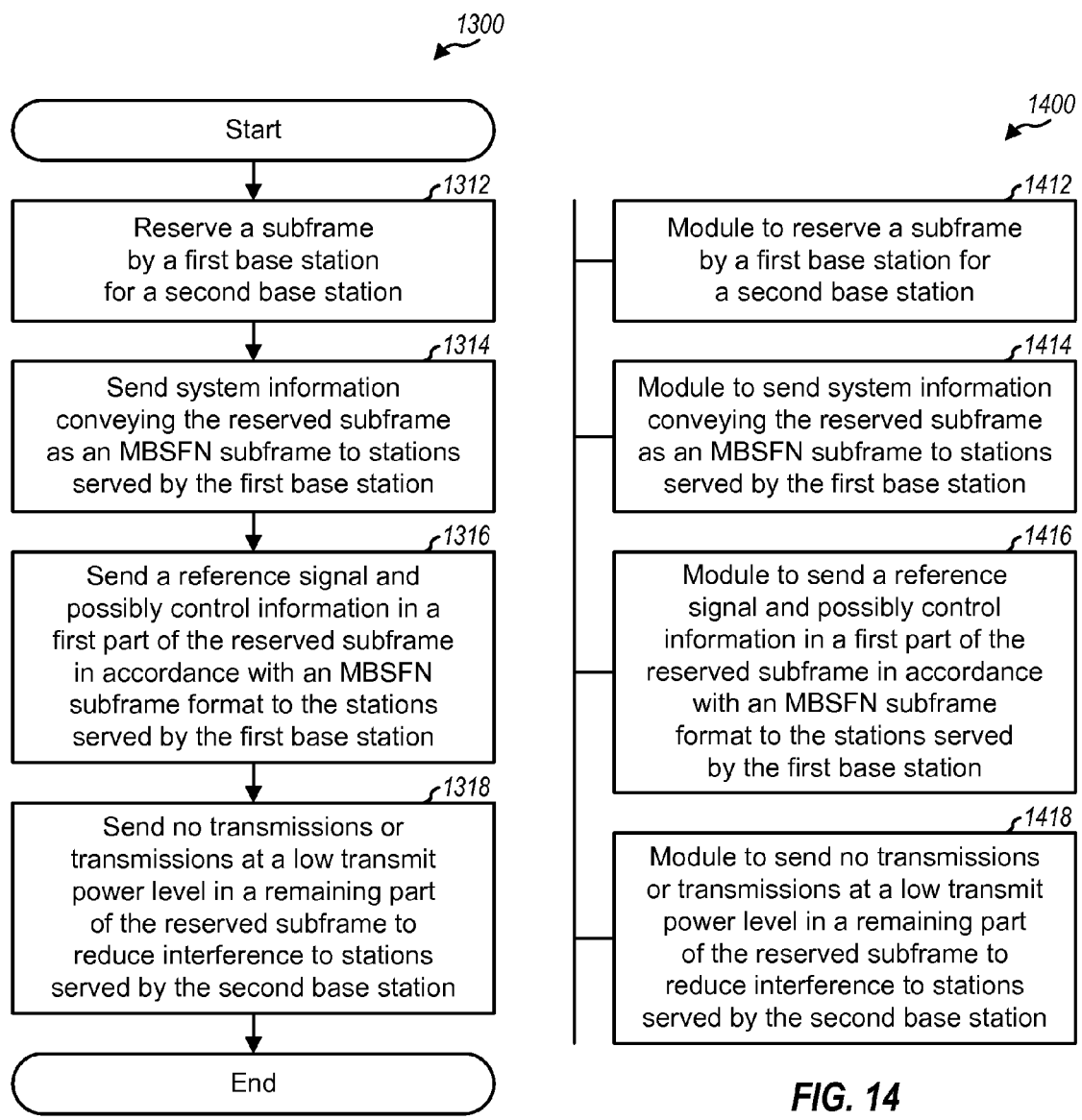

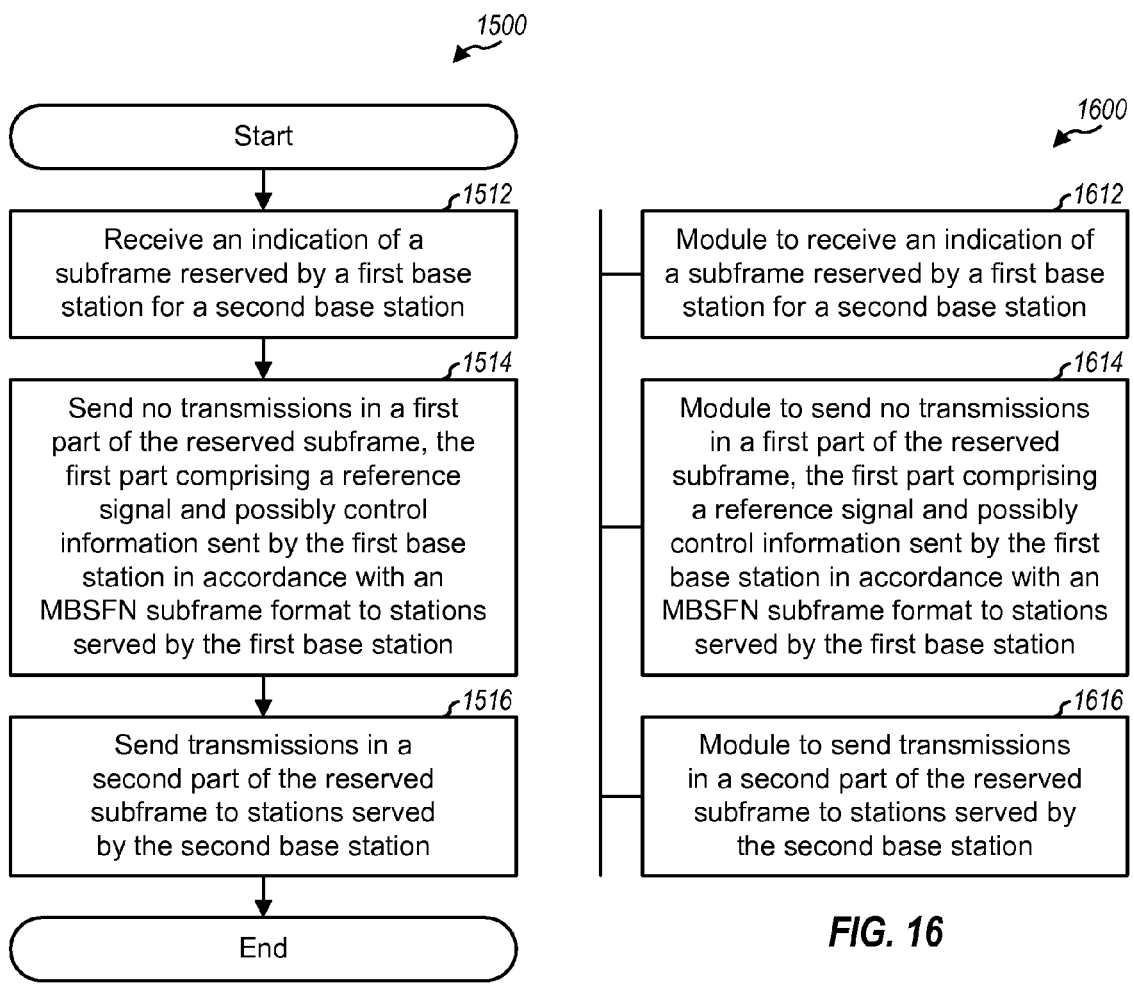

METHOD AND APPARATUS FOR USING MBSFN SUBFRAMES TO SEND UNICAST INFORMATION

The present application claims priority to provisional U.S. Application Ser. No. 61/043,104, entitled "SYSTEMS AND METHODS TO MINIMIZE OVERHEAD THROUGH THE USE OF MBSFN FRAMES," filed Apr. 7, 2008, assigned to the assignee hereof and incorporated herein by reference.

BACKGROUND

I. Field

The present disclosure relates generally to communication, and more specifically to techniques for sending information in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A base station may transmit unicast data to individual UEs and/or broadcast data to multiple UEs. The base station may also transmit a reference signal (or pilot) and control information to the UEs to support communication with the base station. The reference signal and control information, although useful, represent overhead that consumes a portion of the available radio resources. It is desirable to reduce overhead due to the reference signal and control information, to the extent possible, in order to improve network capacity.

SUMMARY

Techniques for sending information in a wireless communication network are described herein. The wireless network may support (i) regular subframes used to send unicast information to individual UEs and (ii) multicast/broadcast single frequency network (MBSFN) subframes used to send broadcast information to multiple UEs. Unicast information may comprise data, control information, reference signal, and/or other transmissions sent to specific individual UEs. Broadcast information may comprise data, control information, reference signal, and/or other transmissions sent to multiple UEs. The MBSFN subframes may have lower overhead for the reference signal and control information than the regular subframes.

In an aspect, MBSFN subframes may be used to mitigate interference and support operation by base stations of different power classes, base stations supporting restricted association, relay stations, etc. A first base station may cause high interference to stations (e.g., UEs, relays, etc.) served by a second base station. In one design, the first base station may reserve a subframe for the second base station and may send system information conveying the reserved subframe as an MBSFN subframe to its stations. The first base station may send a reference signal and possibly control information in a first part of the reserved subframe in accordance with an MBSFN subframe format to its stations. These stations may expect the reserved subframe to be an MBSFN subframe (e.g., due to the system information) but would not be assigned to receive data in the MBSFN subframe. The first base station may send either no transmissions or transmissions at a low transmit power level in the remaining part of the reserved subframe in order to reduce interference to the stations served by the second base station. The second base station may send no transmissions in the first part of the reserved subframe and may send unicast information in the remaining part of the reserved subframe to its stations.

In another aspect, MBSFN subframes may be used to support additional base station capabilities. In one design, a base station may send system information conveying a subframe as an MBSFN subframe to "legacy" stations (e.g., legacy UEs) that do not support the additional base station capabilities. The base station may also send signaling conveying the subframe as carrying unicast information for at least one "new" station that support the additional base station capabilities. The legacy stations may receive the system information but not the signaling, and the new stations may receive the signaling. The base station may send a reference signal and possibly control information in a first part of the subframe in accordance with an MBSFN subframe format to the legacy stations. The base station may send unicast information in a second part of the subframe to the at least one new station recognizing the subframe as carrying unicast information.

The base station may send one or more reference signals and/or data with additional capabilities in the second part of the subframe. In one design, the base station may send the reference signal from more than four antennas in the subframe. In another design, the base station may send a dedicated reference signal and unicast data with beamforming to a specific station in the second part of the subframe. In yet another design, the base station may send a channel quality indicator (CQI) reference signal in the second part of the subframe. The CQI reference signal may be used by the stations for channel quality estimation. The base station may also send other reference signals, control information, and/or data in the second part of the subframe.

Various aspects and features of the disclosure are described in further detail below.

BRIEF DESCRIPTION OF THE DRAWINGS

FIGS. 6 and 7 show two exemplary modified MBSFN subframe formats.

FIGS. 9 and 10 show a process and an apparatus, respectively, for sending unicast information in a modified MBSFN subframe.

FIGS. 11 and 12 show a process and an apparatus, respectively, for receiving unicast information from a modified MBSFN subframe.

FIGS. 13 and 14 show a process and an apparatus, respectively, for mitigating interference using a blanked MBSFN subframe.

FIGS. 15 and 16 show a process and an apparatus, respectively, for sending unicast information in a new subframe.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
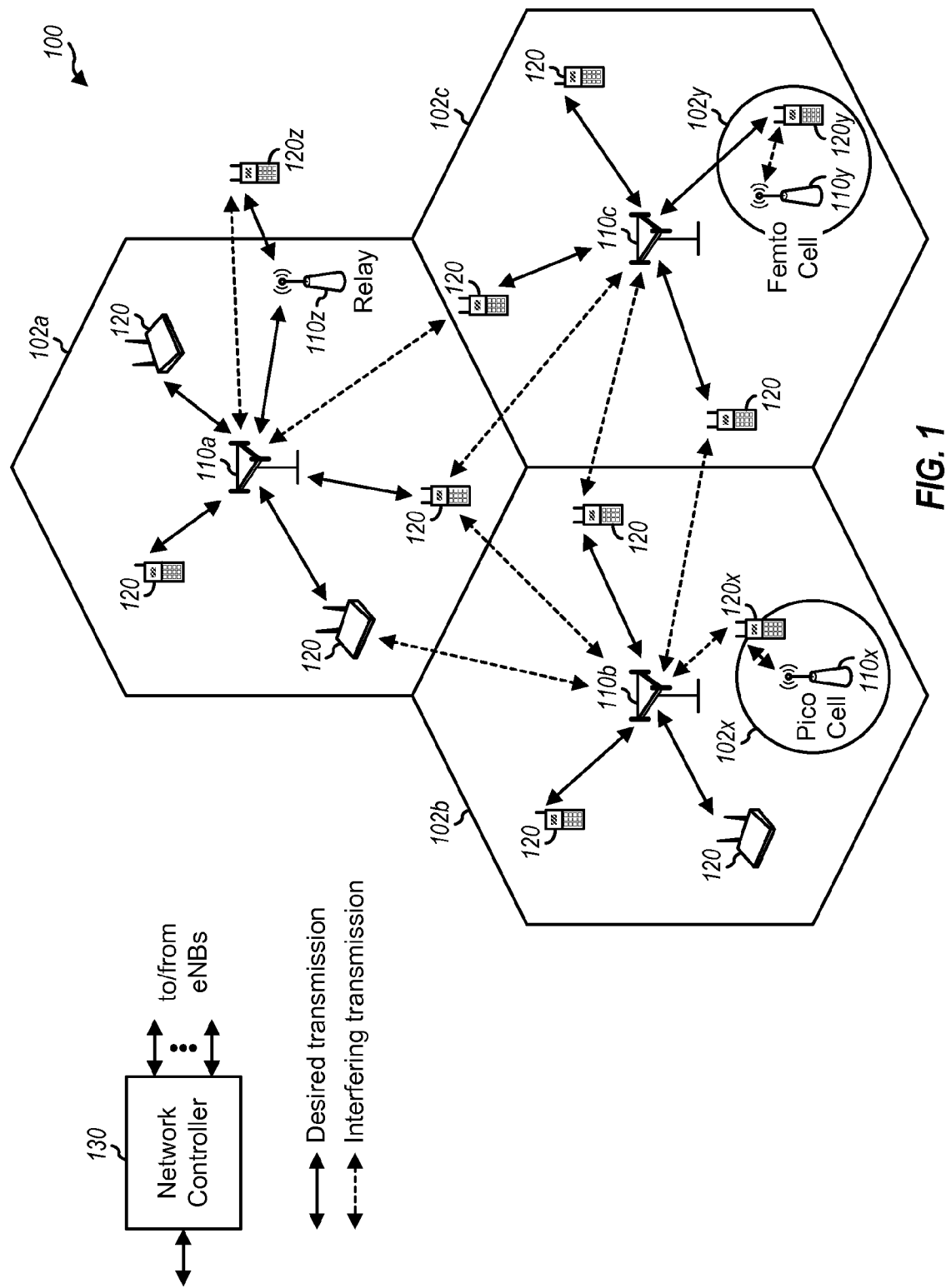
FIG. 1 shows a wireless communication network.

FIG. 1 shows a wireless communication network 100, which may be an LTE network. Wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. To improve network capacity, the overall coverage area of an eNB may be partitioned into multiple (e.g., three) smaller areas. In 3GPP, the term "cell" can refer to the smallest coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell, e.g., UEs for users in the home, UEs for users subscribing to a special service plan, etc. An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b and 110c may be macro eNBs for macro cells 102a, 102b and 102c, respectively. eNB 110x may be a pico eNB for a pico cell 102x. eNB 110y may be a femto eNB for a femto cell 102y.

Wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). In the example shown in FIG. 1, a relay station 110z may communicate with eNB 110a and a UE 120z to facilitate communication between eNB 110a and UE 120z. A relay station may also be referred to as a relay eNB, a relay, etc. In the description herein, a "station" may be a UE, a relay station, or some other entity capable of receiving information.

A network controller 130 may couple to a set of eNBs and provide coordination and control for these eNBs. Network controller 130 may be a single network entity or a collection of network entities. Network controller 130 may communicate with eNBs 110 via a backhaul. eNBs 110 may also communicate with one another, e.g., directly or indirectly via wireless or wireline backhaul.

Wireless network 100 may be a homogeneous network that includes only macro eNBs. Wireless network 100 may also be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 Watts) whereas pico eNBs, femto eNBs, and relays may have a lower transmit power level (e.g., 1 Watt). The techniques described herein may be used for homogeneous and heterogeneous networks.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with an eNB via the downlink and uplink. The downlink (or forward link) refers to the communication link from the eNB to the UE, and the uplink (or reverse link) refers to the communication link from the UE to the eNB. A UE may be able to communicate with macro eNBs, pico eNBs, femto eNBs, relays, and/or other types of eNBs. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 2:
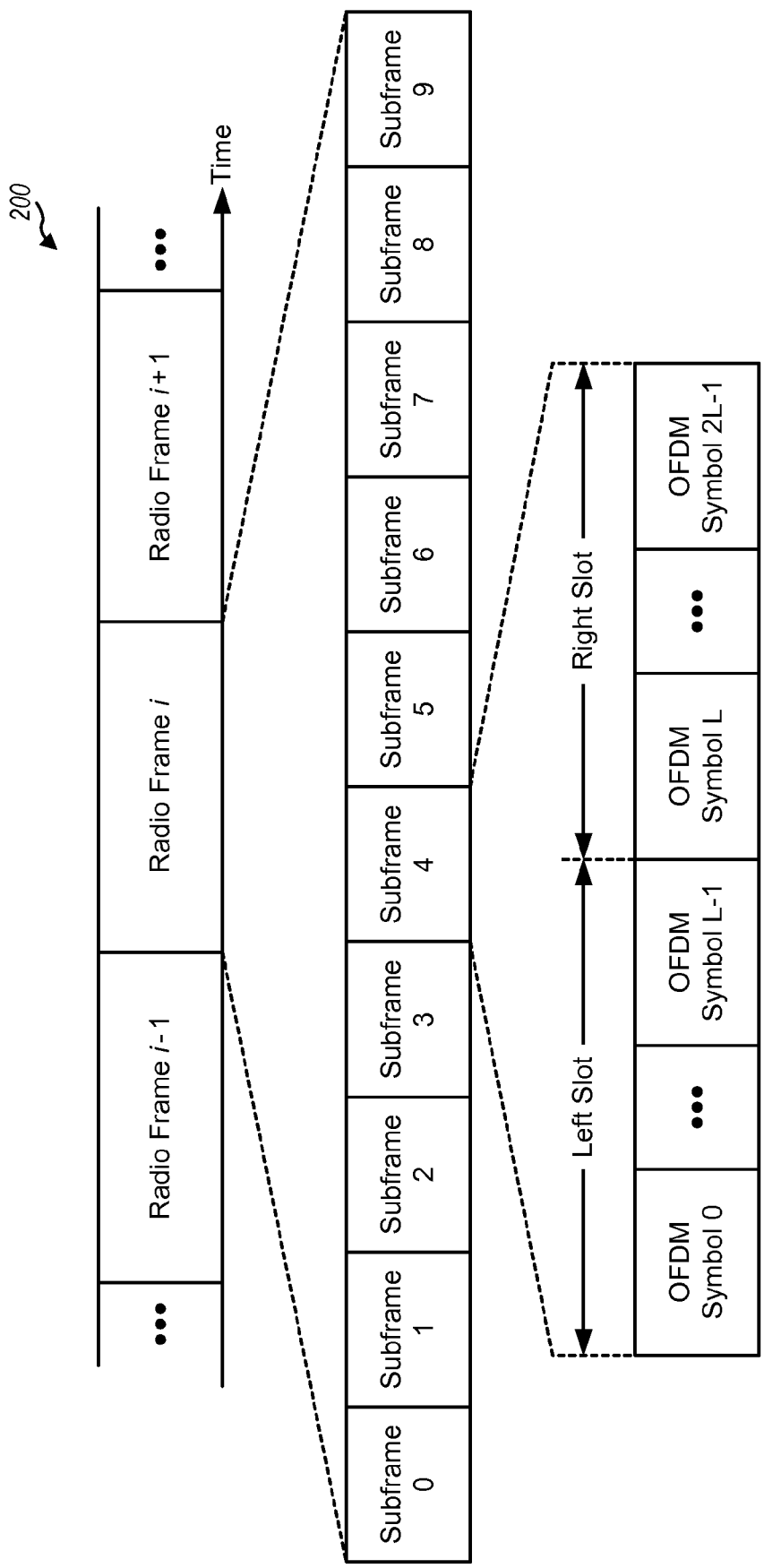
FIG. 2 shows an exemplary frame structure.

FIG. 2 shows a frame structure 200 that may be used for transmission. The transmission timeline may be partitioned into units of radio frames. Each radio frame may have a predetermined duration (e.g., 10 milliseconds (ms)) and may be partitioned into 10 subframes with indices of 0 through 9. Each subframe may include two slots, and each slot may include L symbol periods. In LTE, L may be equal to 6 for an extended cyclic prefix or 7 for a normal cyclic prefix.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

On the downlink, each subframe may include 2L OFDM symbols in symbol periods 0 through 2L-1, as shown in FIG. 2. On the uplink, each subframe may include 2L SC-FDMA symbols in symbol periods 0 through 2L-1 (not shown in FIG. 2).

LTE supports transmission of unicast information to specific UEs. LTE also supports transmission of broadcast information to all UEs and multicast information to a group of UEs. A multicast/broadcast transmission may also be referred to as an MBSFN transmission. A subframe used for sending unicast information may be referred to as a regular subframe. A subframe used for sending multicast and/or broadcast information may be referred to as an MBSFN subframe, a broadcast subframe, etc.

In general, an MBSFN subframe is a subframe that carries a reference signal and certain control information in a first part of the subframe and may or may not carry multicast/broadcast data in a second part of the subframe. An eNB may declare a subframe as an MBSFN subframe (e.g., via system information) to legacy UEs. These legacy UEs would then expect the reference signal and control information in the first part of the MBSFN subframe. The eNB may separately inform a legacy UE (e.g., via upper layer signaling) to expect broadcast data in the second part of the MBSFN subframe, and the legacy UE would then expect broadcast data in the second part. The eNB may also not inform any legacy UE to expect broadcast data in the second part of the MBSFN subframe, and the legacy UEs would not expect broadcast data in the second part. These characteristics of the MBSFN subframe may be exploited as described below.

For simplicity, in much of the description herein, the term "broadcast" generically refers to transmission to more than one UE and thus covers both multicast to a group of UEs and broadcast to all UEs. LTE supports several subframe formats for sending unicast information and broadcast information.

Figure 3:
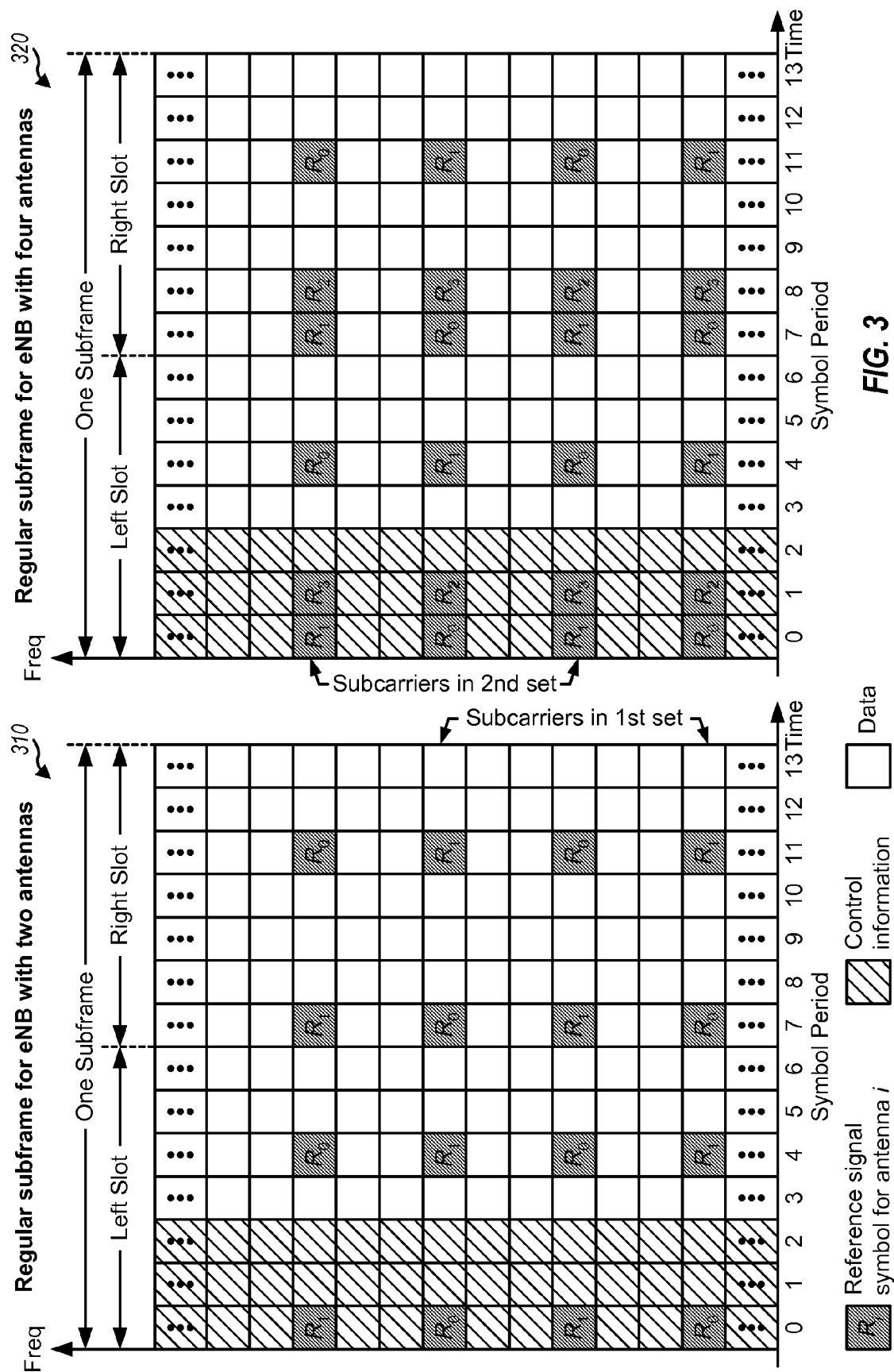
FIG. 3 shows two exemplary regular subframe formats.

FIG. 3 shows two regular subframe formats 310 and 320 that may be used to send unicast information to specific UEs on the downlink. For the normal cyclic prefix in LTE, the left slot includes seven symbol periods 0 through 6, and the right slot includes seven symbol periods 7 through 13. Each slot includes a number of resource blocks. In LTE, each resource block covers 12 subcarriers in one slot and includes a number of resource elements. Each resource element covers one subcarrier in one symbol period and may be used to send one symbol, which may be a real or complex value.

Subframe format 310 may be used by an eNB equipped with two antennas. A cell-specific reference signal may be sent in symbol periods 0, 4, 7 and 11. A reference signal is a signal that is known a priori by a transmitter and a receiver and may also be referred to as pilot, etc. A cell-specific reference signal is a reference signal that is specific for a cell, e.g., generated with one or more symbol sequences determined based on a cell identity (ID). A cell-specific reference signal may also be referred to as a common reference signal, common pilot, etc. For antenna 0, the cell-specific reference signal may be sent on a first set of subcarriers in symbol periods 0 and 7 and on a second set of subcarriers in symbol periods 4 and 11. Each set includes subcarriers that are spaced apart by six subcarriers. The subcarriers in the first set are offset from the subcarriers in the second set by three subcarriers. For antenna 1, the cell-specific reference signal may be sent on the second set of subcarriers in symbol periods 0 and 7 and on the first set of subcarriers in symbol periods 4 and 11. In FIGS. 3 through 7, for a given resource element with label $R_i$, a reference signal symbol may be sent on that resource element from antenna i, and no symbols may be sent on that resource element from other antennas.

Some resource elements in symbol period 0 may be used to send a Physical Control Format Indicator Channel (PCFICH). The PCFICH may indicate the number of symbol periods (N) used for a Physical Downlink Control Channel (PDCCH) and a Physical HARQ Indicator Channel (PHICH) in the subframe, where N may be equal to 1, 2 or 3. The PDCCH and PHICH may be sent in symbol periods 0 to N-1 of the subframe. The remaining symbol periods N to 13 may be used for a Physical Downlink Shared Channel (PDSCH). The PDCCH and PHICH may carry control information for UEs scheduled for data transmission on the downlink and/or uplink. The PDSCH may carry unicast data to UEs scheduled for data transmission on the downlink.

Subframe format 320 may be used by an eNB equipped with four antennas. The cell-specific reference signal may be sent in symbol periods 0, 1, 4, 7, 8 and 11. For antennas 0 and 1, the cell-specific reference signal may be sent on the first and second sets of subcarriers as described above for subframe format 310. For antenna 2, the cell-specific reference signal may be sent on the first set of subcarriers in symbol period 1 and on the second set of subcarriers in symbol period 8. For antenna 3, the cell-specific reference signal may be sent on the second set of subcarriers in symbol period 1 and on the first set of subcarriers in symbol period 8. The PCFICH may be sent in symbol period 0, the PDCCH and PHICH may be sent in symbol periods 0 to N-1, and the PDSCH may be sent in the remaining symbol periods N to 13 of the subframe.

A UE may process a regular subframe to recover the PCFICH, PDCCH and PHICH. The UE may also process and use the cell-specific reference signal for various purposes such as synchronization, cell search, channel quality estimation, signal strength measurement, channel estimation, etc. The UE may determine CQI information based on the estimated channel quality and may report the CQI information and/or signal strength measurements to a serving eNB. The serving eNB may use the reported information to schedule the UE for data transmission, to select a rate for data transmission to the UE, to determine a change of serving eNB for the UE, etc.

It may be desirable to support new systems and/or new capabilities (e.g., a new version of LTE) that can co-exist in the same frequency band with LTE. For example, it may be desirable to allow for co-existence of eNBs of different power classes (e.g., high-power eNBs and low-power eNBs) as well as eNBs supporting restricted association. A wireless network with eNBs of different power classes and/or eNBs supporting restricted association may encounter dominant interference scenarios. In a dominant interference scenario, a UE may observe high interference from one or more interfering eNBs, and the interference may be much stronger than a desired signal from a serving eNB at the UE.

A dominant interference scenario may occur due to range extension, which is a scenario in which a UE connects to an eNB with lower pathloss and lower geometry among all eNBs detected by the UE. For example, referring to FIG. 1, UE 120x may detect macro eNB 110b and pico eNB 110x and may have lower received power for pico eNB 110x than macro eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

A dominant interference scenario may also occur due to restricted association. For example, in FIG. 1, UE 120y may be close to femto eNB 110y and may have high received power for this eNB. However, UE 120y may not be able to access femto eNB 110y due to restricted association and may then connect to unrestricted macro eNB 110c with lower received power. UE 120y may then observe high interference from femto eNB 110y on the downlink and may also cause high interference to eNB 110y on the uplink.

In general, a first eNB may cause high interference to UEs served by a second eNB. High interference may be quantified by interference exceeding a threshold or based on some other criteria. To mitigate high interference, the first eNB may reserve some subframes for the second eNB. The second eNB may transmit data to its UEs on the reserved subframes. The first eNB may either transmit nothing or transmit at a lower power level on the reserved subframes in order to reduce interference to the UEs served by the second eNB. However, the first eNB may still transmit the PCFICH, PDCCH, PHICH, and cell-specific reference signal in each reserved subframe in order to support operation by its UEs, which may expect these transmissions. The UEs served by the second eNB may then observe high interference from the first eNB on the resource elements used by the first eNB for the PCFICH, PDCCH, PHICH, and cell-specific reference signal. Furthermore, different interfering eNBs may use different sets of subcarriers for their cell-specific reference signals, and an entire OFDM symbol may then be unusable by the second eNB because of high interference from the cell-specific reference signals. For subframe 310 shown in FIG. 3, the second eNB may not be able to use symbol periods 0, 1, 2, 4, 7 and 11 (or 6 out of 14 symbol periods) if the first eNB is equipped with two antennas. For subframe 320, the second eNB may not be able to use symbol periods 0, 1, 2, 4, 7, 8 and 11 (or 7 out of 14 symbol periods) if the first eNB is equipped with four antennas. The PCFICH, PDCCH, PHICH and reference signal transmissions from the first eNB may thus represent significant overhead (e.g., 43% to 50% overhead), which may substantially reduce the number of symbol periods that can be used by the second eNB.

In an aspect, "blanked" MBSFN subframes may be used to support operation by eNBs of different power classes, eNBs supporting restricted association, relay stations, etc. An eNB may send an MBSFN subframe, which may include (i) a cell-specific reference signal and control information in the first M symbol periods of the subframe, where M≥1, and (ii) broadcast data in the remaining symbol periods of the subframe. A blanked MBSFN subframe may include (i) the cell-specific reference signal and the control information in the first M symbol periods of the subframe and (ii) no transmissions in the remaining symbol periods of the subframe. A UE may be configured to receive MBSFN transmissions and may then process an MBSFN subframe to recover the broadcast data sent in the subframe. A UE that is not configured to receive MBSFN transmissions may process the first M OFDM symbols carrying the cell-specific reference signal and may ignore the remaining OFDM symbols in the MBSFN subframe. For UEs not configured to receive MBSFN transmissions, a blanked MBSFN subframe may be indistinguishable from an MBSFN subframe carrying broadcast data and would not impact the operation of these UEs.

In the exemplary scenario described above, the first eNB may cause high interference to the UEs served by the second eNB and may reserve some subframes for the second eNBs. The first eNB may treat the reserved subframes as MBSFN subframes and may send system information conveying the MBSFN subframes to its UEs. The first eNB may transmit only the reference signal and control information in each MBSFN subframe to allow its UEs to properly receive the MBSFN subframe. The first eNB may transmit nothing in the remaining part of each MBSFN subframe to reduce interference to the UEs served by the second eNB.

Figure 4:
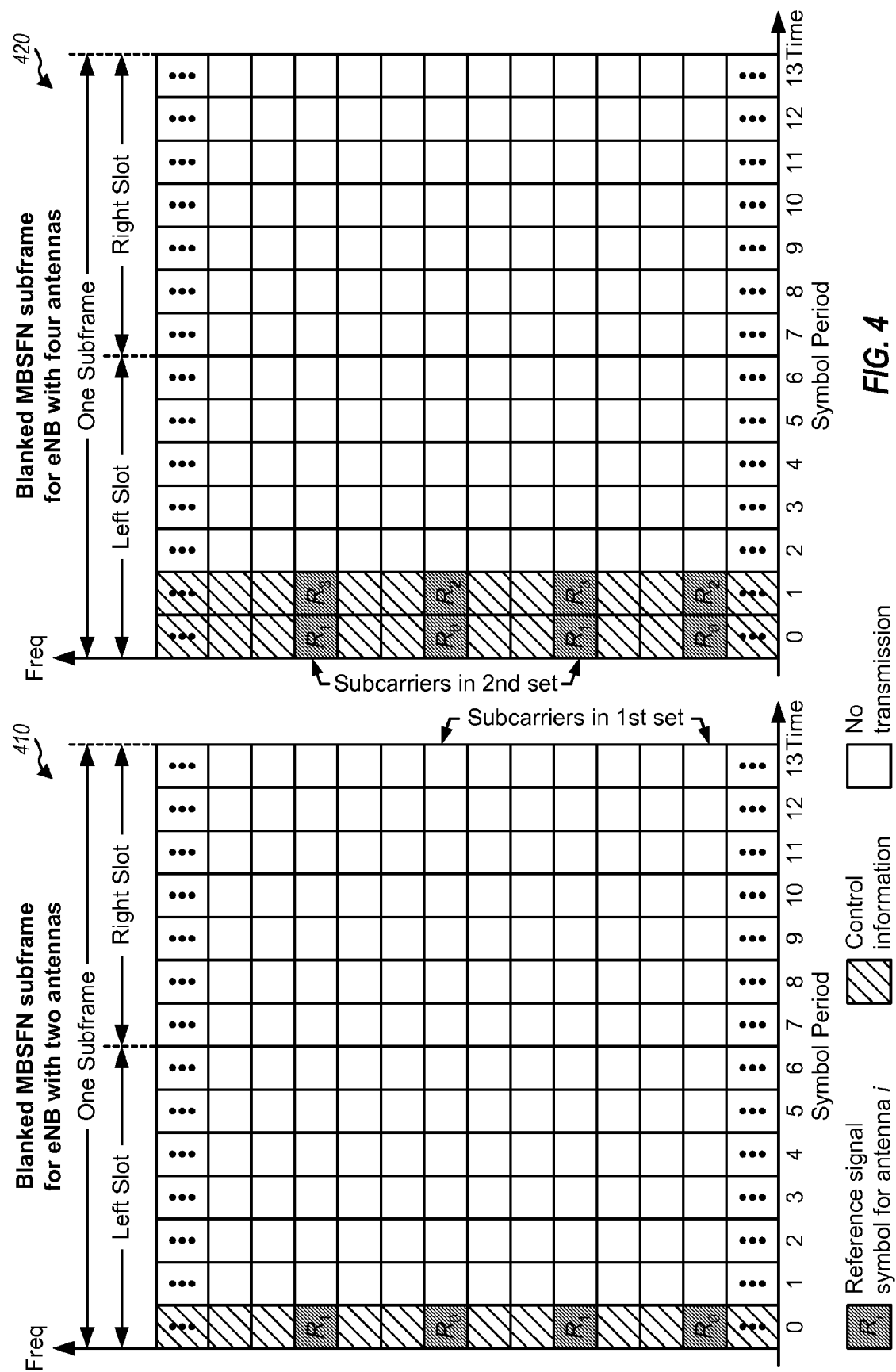
FIG. 4 shows two exemplary blanked MBSFN subframe formats.

FIG. 4 shows exemplary designs of two blanked MBSFN subframe formats 410 and 420 that may be used by an eNB to reduce interference. Subframe format 410 may be used by an eNB equipped with two antennas. A cell-specific reference signal may be sent in symbol period 0 on the first set of subcarriers from antenna 0 and on the second set of subcarriers from antenna 1. The PCFICH may be sent in symbol period 0 of the subframe, and the PDCCH and PHICH may be sent in symbol periods 0 to M−1, where M=1 for the design shown in FIG. 4 but in general M≤3. No transmissions may be sent in the remaining symbol periods M to 13.

Subframe format 420 may be used by an eNB equipped with four antennas. The cell-specific reference signal may be sent in symbol periods 0 and 1. The cell-specific reference signal may be sent from antennas 0 and 1 in symbol period 0 as described above for subframe format 410.

The cell-specific reference signal may be sent in symbol period 1 on the first set of subcarriers from antenna 2 and on the second set of subcarriers from antenna 3. The PCFICH may be sent in symbol period 0 of the subframe, and the PDCCH and PHICH may be sent in symbol periods 0 to M−1, where M=2 for the design shown in FIG. 4 but in general M≤3. No transmissions may be sent in the remaining symbol periods M to 13.

FIG. 4 shows exemplary designs of two blanked MBSFN subframe formats. A blanked MBSFN subframe may also be defined with other subframe formats.

An MBSFN subframe carrying broadcast data may have a format similar to format 410 or 420 in FIG. 4. For this MBSFN subframe, the PDSCH may be sent in the remaining symbol periods N to 13 of the subframe and may carry broadcast data.

In the exemplary scenario described above, the first eNB may cause high interference to the UEs served by the second eNB and may reserve some subframes for the second eNB. The first eNB may define the reserved subframes as blanked MBSFN subframes. The first eNB may transmit the PCFICH, PDCCH, PHICH, and cell-specific reference signal in the first M symbol periods (e.g., the first one or two symbol periods) of each blanked MBSFN subframe to its UEs, e.g., as shown in FIG. 4. The first eNB may send no transmissions in the remaining symbol periods of each blanked MBSFN subframe. The PCFICH, PDCCH, PHICH and reference signal transmissions may occupy only one symbol period (or 7% overhead) if the first eNB is equipped to two antennas or only two symbol periods (or 14% overhead) if the first eNB is equipped to four antennas. Substantial saving in overhead may be achieved by defining the reserved subframes as blanked MBSFN subframes instead of regular subframes. The first eNB would not send broadcast data in the blanked MBSFN subframes and would not assign these MBSFN subframes to any UE for broadcast reception.

The second eNB may send transmissions to its UEs in the reserved subframes. The second eNB may transmit in all symbol periods not used by the first eNB for transmissions of the PCFICH, PDCCH, PHICH, and cell-specific reference signal. The UEs served by the second eNB would observe less or no interference from the first eNB in the symbol periods used by the second eNB.

For a dominant interference scenario due to range extension, the first eNB may be a macro eNB (e.g., eNB 110b in FIG. 1), and the second eNB may be a pico eNB (e.g., eNB 110x in FIG. 1). The macro eNB may reserve some subframes for the pico eNB and may treat the reserved subframes as blanked MBSFN subframes. For a dominant interference scenario due to restricted association, the first eNB may be a femto eNB (e.g., eNB 110y in FIG. 1), and the second eNB may be a macro eNB (e.g., eNB 110c in FIG. 1). The femto eNB may reserve some subframes for the macro eNB and may treat the reserved subframes as blanked MBSFN subframes. For a relay scenario, the first eNB may be a macro eNB (e.g., eNB 110a in FIG. 1), and the second eNB may be a relay (e.g., relay 110z in FIG. 1), or vice versa. The macro eNB may reserve some subframes for the relay and may treat the reserved subframes as blanked MBSFN subframes.

For all scenarios described above, overhead may be reduced further if the UEs served by the first eNB do not use the cell-specific reference signal in the reserved subframes for channel quality estimation or signal strength measurements. In this case, the first eNB may transmit nothing in each blanked MBSFN subframe, and there may be no overhead due to reference signal transmission.

The second eNB may avoid using each symbol period used by the first eNB in each blanked MBSFN subframe, which may include only the first M symbol periods in each subframe. The second eNB may transmit reference signal, control information, and unicast data to its UEs in the remaining symbol periods of each blanked MBSFN subframe. The second eNB may send its transmissions using various subframe formats.

Figure 5:
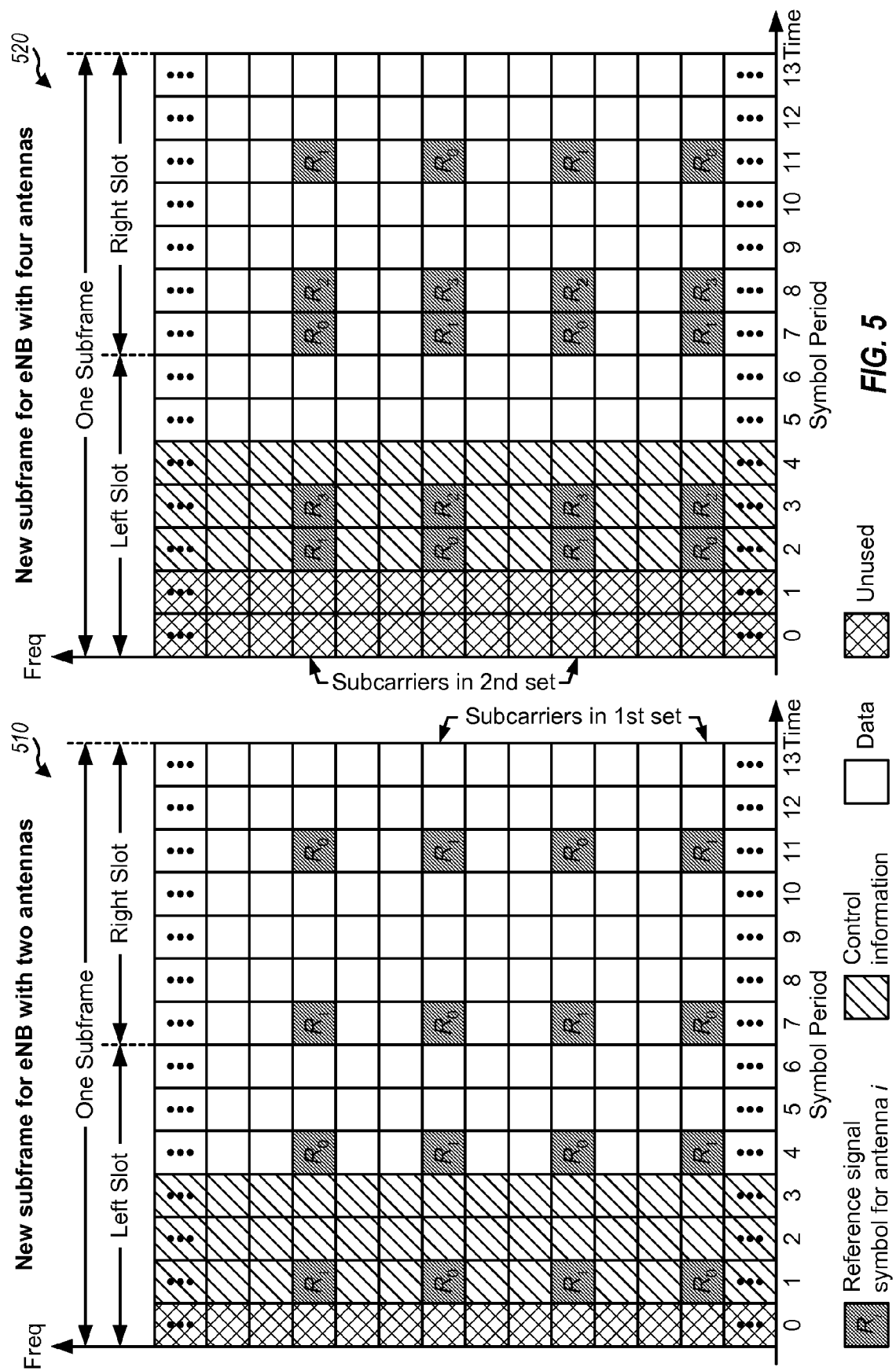
FIG. 5 shows two exemplary new subframe formats.

FIG. 5 shows exemplary designs of two new subframe formats 510 and 520 that may be used by the second eNB for sending transmissions to its UEs. Subframe format 510 assumes that symbol period 0 is used by the first eNB and is not used by the second eNB. Subframe format 510 may be used by the second eNB if the first and second eNBs are each equipped with two antennas. A cell-specific reference signal may be sent in symbol periods 1, 4, 7 and 11. For antenna 0, the cell-specific reference signal may be sent on the first set of subcarriers in symbol periods 1 and 7 and on the second set of subcarriers in symbol periods 4 and 11. For antenna 1, the cell-specific reference signal may be sent on the second set of subcarriers in symbol periods 1 and 7 and on the first set of subcarriers in symbol periods 4 and 11. The PCFICH may be sent in symbol period 1, the PDCCH and PHICH may be sent in symbol periods 1 to N, where 1≤N≤3, and the PDSCH may be sent in the remaining symbol periods N+1 to 13 of the subframe.

Subframe format 520 assumes that symbol periods 0 and 1 are used by the first eNB and are not used by the second eNB. Subframe format 520 may be used by the second eNB if the first and second eNBs are each equipped with four antennas. The cell-specific reference signal may be sent in symbol periods 2, 3, 7, 8 and 11. For antenna 0, the cell-specific reference signal may be sent on the first set of subcarriers in symbol periods 2 and 11 and on the second set of subcarriers in symbol period 7. For antenna 1, the cell-specific reference signal may be sent on the second set of subcarriers in symbol periods 2 and 11 and on the first set of subcarriers in symbol period 7. For antenna 2, the cell-specific reference signal may be sent on the first set of subcarriers in symbol period 3 and on the second set of subcarriers in symbol period 8. For antenna 3, the cell-specific reference signal may be sent on the second set of subcarriers in symbol period 3 and on the first set of subcarriers in symbol period 8. The PCFICH may be sent in symbol period 2, the PDCCH and PHICH may be sent in symbol periods 2 to N+1, where 1≤N≤3, and the PDSCH may be sent in the remaining symbol periods N+2 to 13 of the subframe.

FIG. 5 shows exemplary designs of two new subframe formats that may be used by the second eNB. A new subframe may also be defined with other subframe formats. For example, a new subframe format may have one unusable symbol period 0 and may support a reference signal from four antennas. A new subframe format may also have two unusable symbol periods 0 and 1 and may support a reference signal from two antennas. In general, a new subframe may be defined with M unused symbol periods. The remaining symbol periods may be used to send reference signal for any number of antennas, control information, and data.

In another aspect, "modified" MBSFN subframes may be used to support additional eNB capabilities. An eNB may desire to send transmissions with additional capabilities not supported by existing regular subframe formats. The eNB may reserve some subframes for employing these additional capabilities. The eNB may treat the reserved subframes as modified MBSFN subframes and may send system information conveying the MBSFN subframes to legacy UEs. The eNB may also send signaling conveying the modified MBSFN subframes to new UEs capable of processing these subframes. The eNB may transmit the reference signal and control information in each modified MBSFN subframe to allow the legacy UEs to properly receive the MBSFN subframe. The eNB may transmit using its additional capabilities in the remaining part of each modified MBSFN subframe to the new UEs. A modified MBSFN subframe may thus appear as a normal MBSFN subframe to the legacy UEs and would not impact the operation of these UEs.

The eNB may transmit the PCFICH, PDCCH, PHICH, and cell-specific reference signal in the first M symbol periods (e.g., the first one or two symbol periods) of each modified MBSFN subframe, e.g., as shown in FIG. 4. The eNB would not send broadcast data in the modified MBSFN subframes and would not assign these MBSFN subframes to any UE for broadcast reception. The eNB may send unicast information and/or other transmissions in various manners in the remaining symbol periods of each modified MBSFN subframe to the new UEs. The new UEs may be notified via signaling to process the modified MBSFN subframes and may be able to recover the unicast information sent to these UEs. The legacy UEs may simply process the first M OFDM symbols in each modified MBSFN subframe and may ignore the remaining OFDM symbols in the subframe.

In one design, the modified MBSFN subframes may be used to support more antennas at an eNB. The eNB may be equipped with more than four antennas, e.g., six, eight, or possibly more antennas. A modified MBSFN subframe may include a cell-specific reference signal from two antennas in one symbol period or from four antennas in two symbol periods, e.g., as shown in FIG. 4. A cell-specific reference signal for additional antennas may be sent in any of the remaining symbol periods in the modified MBSFN subframe.

FIG. 6 shows an exemplary design of a modified MBSFN subframe format 610 supporting six transmit antennas at an eNB. Subframe format 610 includes a cell-specific reference signal in symbol periods 0 and 1, which may coincide with a cell-specific reference signal in an MBSFN subframe carrying broadcast data. For antenna 0, the cell-specific reference signal may be sent on the first set of subcarriers in symbol period 0 and on the second set of subcarriers in symbol period 7. For antenna 1, the cell-specific reference signal may be sent on the second set of subcarriers in symbol period 0 and on the first set of subcarriers in symbol period 7. For antenna 2, the cell-specific reference signal may be sent on the first set of subcarriers in symbol period 1 and on the second set of subcarriers in symbol period 8. For antenna 3, the cell-specific reference signal may be sent on the second set of subcarriers in symbol period 1 and on the first set of subcarriers in symbol period 8. For antenna 4, the cell-specific reference signal may be sent on the first set of subcarriers in symbol period 4 and on the second set of subcarriers in symbol period 11. For antenna 5, the cell-specific reference signal may be sent on the second set of subcarriers in symbol period 4 and on the first set of subcarriers in symbol period 11. The PCFICH may be sent in symbol period 0, the PDCCH and PHICH may be sent in symbol periods 0 to N−1, and the PDSCH may be sent in the remaining symbol periods N to 13 of the subframe. The PDSCH may carry unicast data for one or more new UEs.

In another design, the modified MBSFN subframes may be used to support dedicated reference signals for specific UEs. A modified MBSFN subframe may include a cell-specific reference signal from two antennas in one symbol period or from four antennas in two symbol periods, e.g., as shown in FIG. 4. A dedicated reference signal may be sent from any number of antennas in any of the remaining symbol periods in the modified MBSFN subframe. The dedicated reference signal and other unicast information may be sent with beamforming to a specific UE. The UE may derive a channel estimate based on the dedicated reference signal and may perform coherent detection for the unicast information with the channel estimate.

FIG. 7 shows an exemplary design of a modified MBSFN subframe format 710 supporting a dedicated reference signal. Subframe format 710 includes a cell-specific reference signal in symbol periods 0 and 1, which may coincide with a cell-specific reference signals in an MBSFN subframe carrying broadcast data. A dedicated reference signal may be sent on the first set of subcarriers in symbol periods 4, 7 and 11 and on the second set of subcarriers in symbol periods 4, 8 and 11 instead of the cell-specific reference signal. For each resource element used for the dedicated reference signal and labeled with "D" in FIG. 7, T reference signal symbols may be sent from T antennas at an eNB, where T may be equal to 2, 4, etc. For each resource element used for the cell-specific reference signal and labeled with "$R_i$" in FIG. 7, one reference signal symbol may be sent from one antenna, and no transmissions may be sent from the other T−1 antennas. The PCFICH may be sent in symbol period 0, the PDCCH and PHICH may be sent in symbol periods 0 to N−1, and the PDSCH may be sent in the remaining symbol periods N to 13 of the subframe. The PDSCH may carry unicast data for a specific UE.

FIG. 7 shows a modified MBSFN subframe with a dedicated reference signal and unicast information for one UE. In general, a modified MBSFN subframe may carry one or more dedicated reference signals and unicast information for one or more UEs. The dedicated reference signal for each UE may be sent in any number of symbol periods and on any number of subcarriers in the modified MBSFN subframe. A cell-specific reference signal may also be sent in any number of symbol periods in the modified MBSFN subframe.

In yet another design, the modified MBSFN subframes may be used to support a CQI reference signal or pilot. A CQI reference signal may be sent periodically (but possibly less frequently than the cell-specific reference signal) and may be used by the UEs for channel quality estimation. A CQI reference signal may be sent at higher transmit power, on more subcarriers, and/or from more antennas than the cell-specific reference signal, which may improve channel quality estimation. A CQI reference signal may be sent infrequently (e.g., once every 10 subframes) and/or with little overhead and may be unsuitable for channel estimation. A CQI reference signal may then be coupled with additional pilots (e.g., dedicated reference signals) that may be used for channel estimation.

A modified MBSFN subframe may include a legacy cell-specific reference signal in the first M symbol periods, e.g., as shown in FIG. 4. The legacy cell-specific reference signal may also be sent in other symbol periods in the modified MBSFN subframe, e.g., in each symbol period in which the cell-specific reference signal is sent in a regular subframe. The modified MBSFN subframe may also include a CQI reference signal, which may be sent in any number of symbol periods and on any number of subcarriers in the modified MBSFN subframe. The CQI reference signal may be sent in additional to, or in place of, the cell-specific reference signal.

Other capabilities may also be supported with MBSFN subframes. For example, the MBSFN subframe format shown in FIG. 5 may be used to support new capabilities through MBSFN signaling. This MBSFN subframe format may not be understood by legacy UEs. In a dominant interference scenario, an interfering eNB may create an almost-blank subframe by using an MBSFN subframe. However, the interfering eNB may not be allowed to blank the PDCCH, PHICH, and reference signal in the first few OFDM symbols of the MBSFN subframe. The PDCCH, PHICH, and reference signal from the interfering eNB may collide with those from other eNBs. A UE may be unable to demodulate the PDCCH, PHICH, and reference signal from a weak eNB even with blanking by the interfering eNB. The weak eNB may then use new control and pilot transmissions to this UE. For example, the weak eNB may send new control channels on some resource blocks of the subframe. The weak eNB may also use an MBSFN subframe format in order to use the new capabilities with reduced overhead.

Such new capabilities may also be useful for relays. A relay may be unable to transmit and receive on the same frequency band at the same time. The relay may then blank its transmission (e.g., using MBSFN subframes) in order to listen to an eNB on the downlink. The relay may then listen to the eNB in these MBSFN subframes. However, the relay may still be unable to receive to the PDCCH, PHICH, and reference signal from the eNB. The eNB may then use new control signaling on a wireless backhaul link to the relay. The eNB may use MBSFN subframes to support such new capabilities with reduced overhead.

Figure 8:
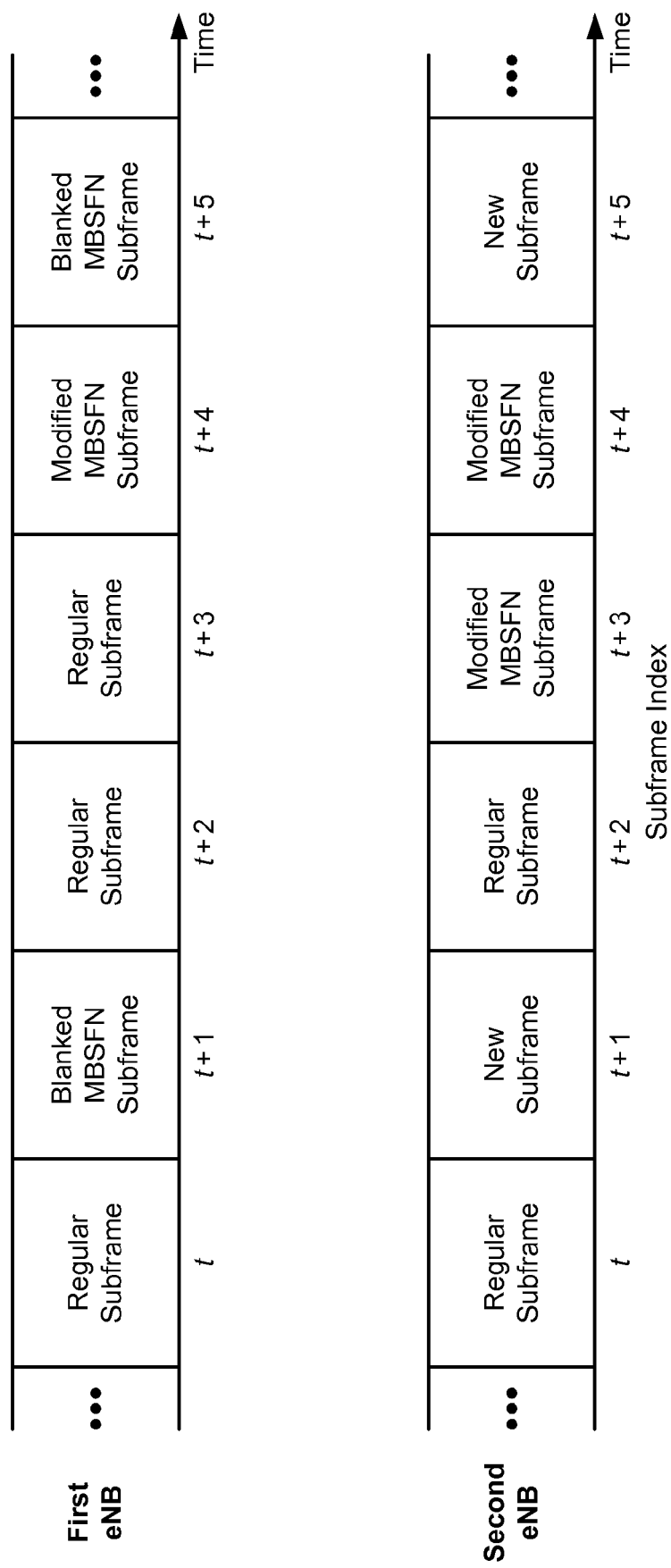
FIG. 8 shows exemplary transmissions by two base stations.

FIG. 8 shows exemplary transmissions by two eNBs on the downlink. The first eNB may cause high interference to some UEs served by the second eNB. The first eNB may reserve subframes t+1, t+5, etc. for the second eNB, may advertise these reserved subframes as MBSFN subframes to its UEs, and may transmit a blanked MBSFN subframe for each reserved subframe. For each reserved subframe, the second eNB may transmit unicast information in a new subframe to its UEs observing high interference from the first eNB. The second eNB may transmit unicast information in regular subframes to UEs not observing high interference from the first eNB.

The first eNB may reserve subframe t+4, etc. for transmissions with additional capabilities, may advertise these reserved subframes as MBSFN subframes to its legacy UEs, and may transmit a modified MBSFN subframe for each reserved subframe to its new UEs. Similarly, the second eNB may reserve subframes t+3, t+4, etc. for transmissions with additional capabilities, may advertise these reserved subframes as MBSFN subframes to its legacy UEs, and may transmit a modified MBSFN subframe for each reserved subframe to its new UEs.

FIG. 9 shows a design of a process 900 for sending data in a wireless communication network. Process 900 may be performed by a base station/eNB (as described below) or by some other entity such as, e.g., a relay. The base station may send system information conveying a subframe as an MBSFN subframe (block 912). The base station may also send signaling conveying the subframe as carrying unicast information for at least one station (block 914). Each station may be a UE, a relay, or some other entity and may support a release later than 3GPP Release 8. The system information and the signaling may be sent in similar or different manners. The base station may send a reference signal (e.g., a cell-specific reference signal) and possibly control information in a first part of the subframe in accordance with an MBSFN subframe format, e.g., to stations expecting the subframe to be an MBSFN subframe (block 916). These stations may be informed of the MBSFN subframe via the system information but would not be assigned to receive data in the MBSFN subframe. The base station may send unicast information (e.g., unicast data, control information, reference signal, etc.) in a second part of the subframe to the at least one station recognizing the subframe as carrying unicast information (block 918).

In one design, the base station may send the reference signal from more than four antennas in the subframe. The base station may send the reference signal from at most four antennas in the first part of the subframe and may send the reference signal from at least one additional antenna in the second part of the subframe, e.g., as shown in FIG. 6. In another design, the base station may send a dedicated reference signal with beamforming to a specific station in the second part of the subframe, e.g., as shown in FIG. 7. The base station may also send unicast information for this station with beamforming in the second part of the subframe. In yet another design, the base station may send a CQI reference signal in the second part of the subframe, e.g., at higher transmit power, on more subcarriers, and/or from more antennas than the reference signal.

FIG. 10 shows a design of an apparatus 1000 for sending data in a wireless communication network. Apparatus 1000 includes a module 1012 to send system information conveying a subframe as an MBSFN subframe, a module 1014 to send signaling conveying the subframe as carrying unicast information for at least one station, a module 1016 to send a reference signal and possibly control information in a first part of the subframe in accordance with an MBSFN subframe format, and a module 1018 to send unicast information in a second part of the subframe to the at least one station recognizing the subframe as carrying unicast information.

FIG. 11 shows a design of a process 1100 for receiving data in a wireless communication network. Process 1100 may be performed by a station, which may be a UE, a relay station, or some other entity. The station may receive signaling conveying a subframe as carrying unicast information for the station (block 1112). The station may receive a first part of the subframe carrying a reference signal and possibly control information sent in accordance with an MBSFN subframe format (block 1114). The station may receive a second part of the subframe carrying unicast information for the station (block 1116). The station may process the second part of the subframe to recover the unicast information for the station (block 1118).

In one design, the station may process the first and second parts of the subframe to recover the reference signal. The reference signal may be sent from at most four antennas in the first part of the subframe and may be sent from at least one additional antenna in the second part of the subframe. The reference signal may also be sent from fewer or more antennas in each part of the subframe. In another design, the station may process the second part of the subframe to recover a dedicated reference signal sent to the station. The dedicated reference signal and the unicast information may be sent with or without beamforming to the station. The station may use the reference signal and/or the dedicated reference signal to recover the unicast information, e.g., for coherent demodulation and/or decoding. In yet another design, the station may process the second part of the subframe to recover a CQI reference signal and may estimate channel quality based on the CQI reference signal.

FIG. 12 shows a design of an apparatus 1200 for receiving data in a wireless communication network. Apparatus 1200 includes a module 1212 to receive signaling conveying a subframe as carrying unicast information for a station, a module 1214 to receive a first part of the subframe carrying a reference signal and possibly control information sent in accordance with an MBSFN subframe format, a module 1216 to receive a second part of the subframe carrying unicast information for the station, and a module 1218 to process the second part of the subframe to recover the unicast information for the station.

FIG. 13 shows a design of a process 1300 for mitigating interference in a wireless communication network. Process 1300 may be performed by a first base station/eNB (as described below) or by some other entity such as, e.g., a relay. The first base station may reserve a subframe for a second base station whose stations (e.g., UEs, relays, etc.) may observe high interference from the first base station (block 1312). The first base station may send system information conveying the reserved subframe as an MBSFN subframe to its stations (block 1314). The first base station may send a reference signal and possibly control information in a first part of the reserved subframe in accordance with an MBSFN subframe format to its stations (block 1316). These stations may expect the reserved subframe to be an MBSFN subframe (e.g., based on the system information) but would not be assigned to receive data in the MBSFN subframe. The first base station may send the reference signal and the control information in the first M symbol periods of the reserved subframe. M may be one or greater and may be dependent on the number of antennas at the first base station, e.g., as shown in FIG. 4. The first base station may send either no transmissions or transmissions at a low transmit power level in the remaining part of the reserved subframe to reduce interference to the stations served by the second base station (block 1318).

For a dominant interference scenario due to range extension, the first base station may be a high-power base station (e.g., a macro eNB) and the second base station may be a low-power base station (e.g., a pico eNB, a femto eNB, or a relay). For a dominant interference scenario due to restricted association, the first base station may have restricted access, and the second base station may have unrestricted access.

FIG. 14 shows a design of an apparatus 1400 for mitigating interference in a wireless communication network. Apparatus 1400 includes a module 1412 to reserve a subframe by a first base station for a second base station, a module 1414 to send system information conveying the reserved subframe as an MBSFN subframe to stations served by the first base station, a module 1416 to send a reference signal and possibly control information in a first part of the reserved subframe in accordance with an MBSFN subframe format to the stations served by the first base station, and a module 1418 to send no transmissions or transmissions at a low transmit power level in a remaining part of the reserved subframe to reduce interference to stations served by the second base station.

FIG. 15 shows a design of a process 1500 for sending data in a wireless communication network. A first base station may cause high interference to stations (e.g., UEs, relay stations, etc.) served by a second base station. Process 1500 may be performed by the second base station/eNB (as described below) or by some other entity such as, e.g., a relay. The second base station may receive an indication of a subframe reserved by the first base station for the second base station (block 1512). The second base station may send no transmissions in a first part of the reserved subframe (block 1514). The first part may comprise a reference signal and possibly control information sent by the first base station in accordance with an MBSFN subframe format to its stations. The first part of the reserved subframe may comprise M symbol periods, where M may be one or greater and may be dependent on the number of antennas at the first base station, e.g., as shown in FIGS. 4 and 5.

The second base station may send transmissions in a second part of the reserved subframe to its stations (block 1516). In one design, the second base station may send a reference signal in any of the symbol periods in the second part of the reserved subframe. The second base station may send control information in at least one symbol period and may send unicast information in the remaining symbol periods in the second part of the reserved subframe to its stations, e.g., as shown in FIG. 5.

FIG. 16 shows a design of an apparatus 1600 for sending data in a wireless communication network. Apparatus 1600 includes a module 1612 to receive an indication of a subframe reserved by a first base station for a second base station, a module 1614 to send no transmissions in a first part of the reserved subframe, the first part comprising a reference signal and possibly control information sent by the first base station in accordance with an MBSFN subframe format to stations served by the first base station, and a module 1616 to send transmissions in a second part of the reserved subframe to stations served by the second base station.

Figures 17, 18:
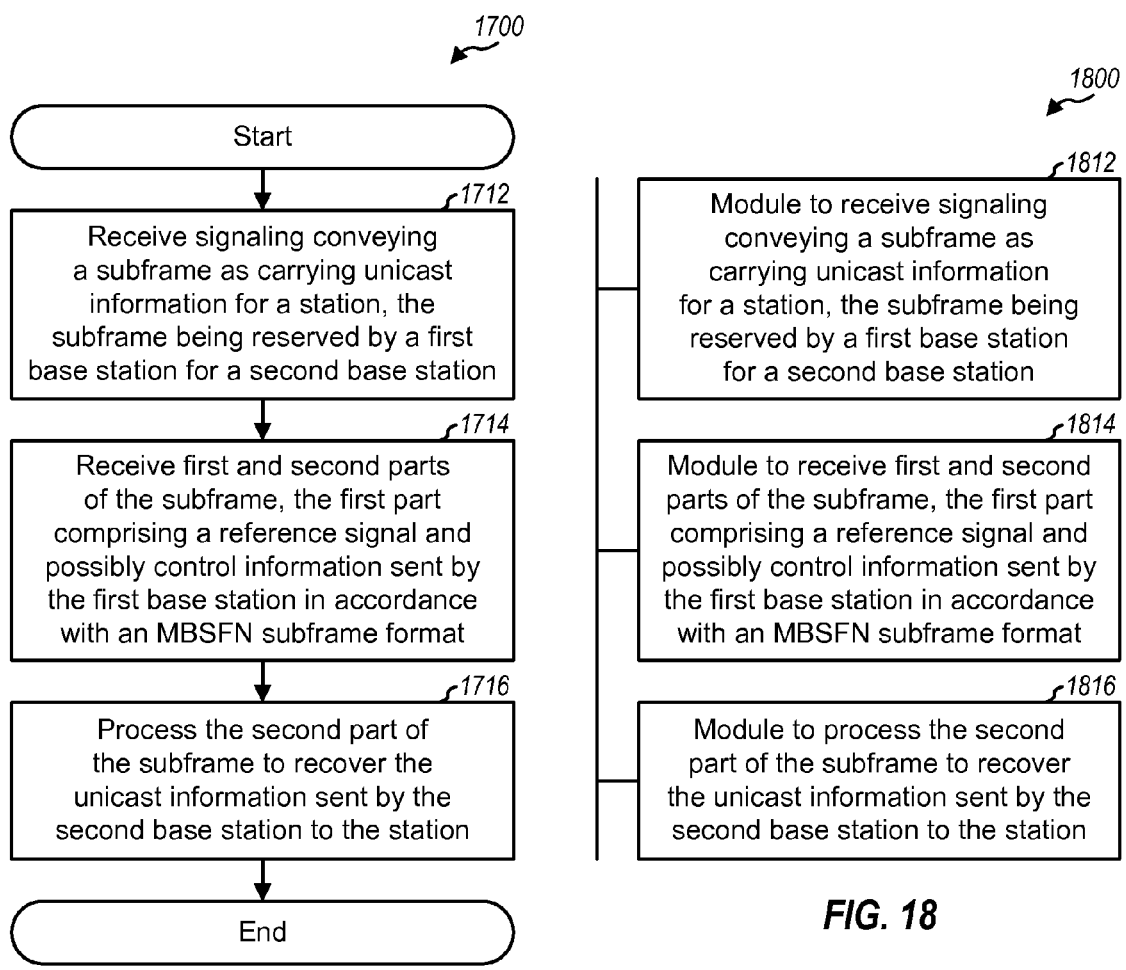
FIGS. 17 and 18 show a process and an apparatus, respectively, for receiving unicast information from a new subframe.

FIG. 17 shows a design of a process 1700 for receiving data in a wireless communication network. Process 1700 may be performed by a station, which may be a UE, a relay, or some other entity. The station may receive signaling conveying a subframe as carrying unicast information for the station, with the subframe being reserved by a first base station for a second base station (block 1712). The station may receive first and second parts of the subframe (block 1714). The first part may span the first M symbol periods of the subframe, where M may be one or greater and may be dependent on the number of antennas at the first base station, e.g., as shown in FIG. 5. The first part may comprise a reference signal and possibly control information sent by the first base station in accordance with an MBSFN subframe format. The reference signal and control information sent by the first base station may cause high interference to any transmission from the second base station.

The station may skip the first part of the subframe. The station may process the second part of the subframe to recover the unicast information sent by the second base station to the station (block 1716). In one design, the station may recover a reference signal from the second part of the subframe. The station may recover control information from at least one symbol period and may recover the unicast information from at least one remaining symbol period in the second part of the subframe, e.g., as shown in FIG. 5.

FIG. 18 shows a design of an apparatus 1800 for receiving data in a wireless communication network. Apparatus 1800 includes a module 1812 to receive signaling conveying a subframe as carrying unicast information for a station, with the subframe being reserved by a first base station for a second base station, a module 1814 to receive first and second parts of the subframe, with the first part comprising a reference signal and possibly control information sent by the first base station in accordance with an MBSFN subframe format, and a module 1816 to process the second part of the subframe to recover the unicast information sent by the second base station to the station.

The modules in FIGS. 10, 12, 14, 16 and 18 may comprise processors, electronics devices, hardware devices, electronics components, logical circuits, memories, software codes, firmware codes, etc., or any combination thereof.

Figure 19:
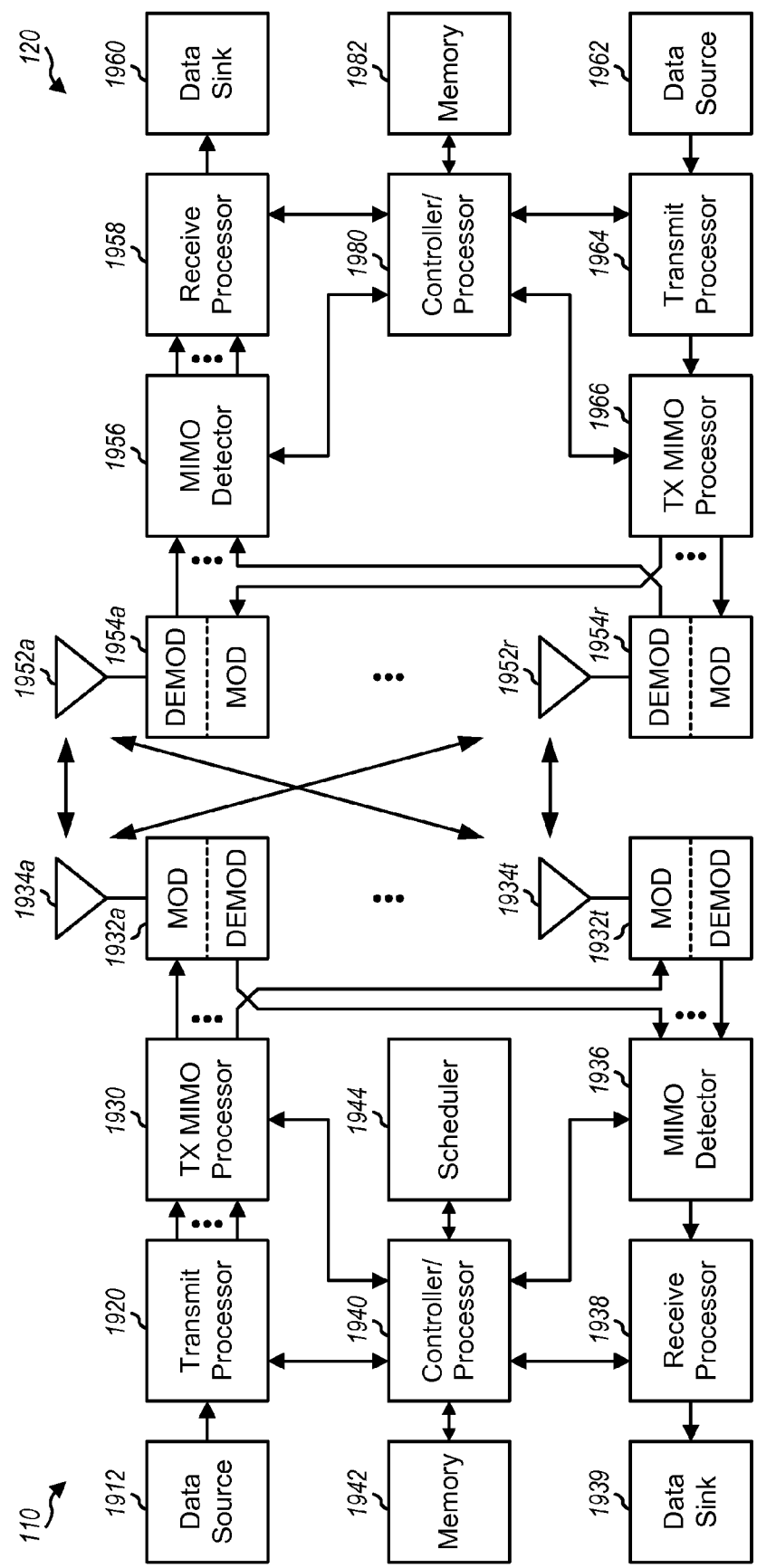
FIG. 19 shows a block diagram of a base station and a UE.

FIG. 19 shows a block diagram of a design of a base station/eNB 110 and a UE 120, which may be one of the base stations/eNBs and one of the UEs in FIG. 1. Base station 110 may be equipped with T antennas 1934a through 1934t, and UE 120 may be equipped with R antennas 1952a through 1952r, where in general T≥1 and R≥1.

At base station 110, a transmit processor 1920 may receive unicast data for individual UEs and/or broadcast data for multiple UEs from a data source 1912, process (e.g., encode, interleave, and modulate) the data, and provide data symbols. Transmit processor 1920 may also receive control information from a controller/processor 1940, process the control information, and provide control symbols. The control information may comprise information to be sent on the PCFICH, PDCCH and PHICH, system information conveying MBSFN subframes, signaling conveying blanked and modified MBSFN subframes, etc. Transmit processor 1920 may also generate reference signal symbols for a cell-specific reference signal, one or more dedicated reference signals, and/or other reference signals. A transmit (TX) multiple-input multiple-output (MIMO) processor 1930 may perform spatial processing (e.g., precoding) on the data symbols, the control symbols, and/or the reference signal symbols, if applicable, and may provide T output symbol streams to T modulators (MODs) 1932a through 1932t. Each modulator 1932 may process a respective output symbol stream (e.g., for OFDM, etc.) to obtain an output sample stream. Each modulator 1932 may further process (e.g., convert to analog, amplify, filter, and upconvert) the output sample stream to obtain a downlink signal. T downlink signals from modulators 1932a through 1932t may be transmitted via T antennas 1934a through 1934t, respectively.

At UE 120, antennas 1952a through 1952r may receive the downlink signals from base station 110 and may provide received signals to demodulators (DEMODs) 1954a through 1954r, respectively. Each demodulator 1954 may condition (e.g., filter, amplify, downconvert, and digitize) a respective received signal to obtain input samples. Each demodulator 1954 may further process the input samples (e.g., for OFDM, etc.) to obtain received symbols. A MIMO detector 1956 may obtain received symbols from all R demodulators 1954a through 1954r, perform MIMO detection on the received symbols if applicable, and provide detected symbols. A receive processor 1958 may process (e.g., demodulate, deinterleave, and decode) the detected symbols, provide decoded data for UE 120 to a data sink 1960, and provide decoded information to a controller/processor 1980.

On the uplink, at UE 120, a transmit processor 1964 may receive and process data from a data source 1962 and control information from controller/processor 1980. Transmit processor 1964 may also generate reference signal symbols for a demodulation reference signal. The symbols from transmit processor 1964 may be precoded by a TX MIMO processor 1966 if applicable, further processed by modulators 1954a through 1954r, and transmitted to base station 110. At base station 110, the uplink signals from UE 120 may be received by antennas 1934, processed by demodulators 1932, detected by a MIMO detector 1936 if applicable, and further processed by a receive processor 1938 to obtain the data and control information sent by UE 120.

Controllers/processors 1940 and 1980 may direct the operation at base station 110 and UE 120, respectively. Processor 1940 and/or other processors and modules at base station 110 may perform or direct process 900 in FIG. 9, process 1300 in FIG. 13, process 1500 in FIG. 15, and/or other processes for the techniques described herein. Processor 1980 and/or other processors and modules at UE 120 may perform or direct process 1100 in FIG. 11, process 1700 in FIG. 17, and/or other processes for the techniques described herein. Memories 1942 and 1982 may store data and program codes for base station 110 and UE 120, respectively. A scheduler 1944 may schedule UEs for data transmission on the downlink and uplink and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending information in a wireless communication network, comprising:
    sending system information declaring a subframe as a multicast/broadcast single frequency network (MBSFN) subframe;
    sending signaling to at least one station to indicate that the MBSFN subframe carries unicast information;
    sending a reference signal in a first part of the MBSFN subframe in accordance with a MBSFN subframe format, wherein the reference signal is sent on a resource element from an antenna and no symbols are sent on the resource element from other antennas; and
    sending unicast information in a second part of the MBSFN subframe to the at least one station recognizing the MBSFN subframe as carrying unicast information.

2. The method of claim 1, wherein the sending the reference signal comprises sending the reference signal in the first part of the MBSFN subframe to stations expecting the MBSFN subframe to be a MBSFN subframe.

3. The method of claim 1, further comprising:
sending control information in the first part of the MBSFN subframe in accordance with the MBSFN subframe format to stations expecting the MBSFN subframe to be a MBSFN subframe.

4. The method of claim 1, further comprising:
sending the reference signal from at most four antennas in the first part of the MBSFN subframe; and
sending the reference signal from at least one additional antenna in the second part of the MBSFN subframe.

5. The method of claim 1, wherein the sending unicast information in the second part of the MBSFN subframe comprises sending at least one of unicast data and control information in the second part of the MBSFN subframe to the at least one station.

6. The method of claim 1, wherein the sending unicast information in the second part of the MBSFN subframe comprises sending a dedicated reference signal in the second part of the MBSFN subframe to a station among the at least one station.

7. The method of claim 1, wherein the sending unicast information in the second part of the MBSFN subframe comprises sending a dedicated reference signal with beamforming in the second part of the MBSFN subframe to a station among the at least one station, and sending unicast information for the station with beamforming in the second part of the MBSFN subframe.

8. The method of claim 1, further comprising:
sending a channel quality indicator (CQI) reference signal in the second part of the MBSFN subframe.

9. The method of claim 1, further comprising:
sending unicast information in the first part of the MBSFN subframe.

10. The method of claim 1, wherein the at least one station supports a release later than 3GPP Release 8.

11. An apparatus for wireless communication, comprising:
means for sending system information declaring a subframe as a multicast/broadcast single frequency network (MBSFN) subframe;
means for sending signaling to at least one station to indicate that the subframe carries unicast information;
means for sending a reference signal in a first part of the MBSFN subframe in accordance with a MBSFN subframe format, wherein the reference signal is sent on a resource element from an antenna and no symbols are sent on the resource element from other antennas; and
means for sending unicast information in a second part of the MBSFN subframe to the at least one station recognizing the MBSFN subframe as carrying unicast information.

12. The apparatus of claim 11, further comprising:
means for sending the reference signal from at most four antennas in the first part of the MBSFN subframe; and
means for sending the reference signal from at least one additional antenna in the second part of the MBSFN subframe.

13. The apparatus of claim 11, wherein the means for sending unicast information in the second part of the MBSFN subframe comprises means for sending a dedicated reference signal with beamforming in the second part of the MBSFN subframe to a station among the at least one station, and means for sending unicast information for the station with beamforming in the second part of the MBSFN subframe.

14. The apparatus of claim 11, further comprising:
means for sending a channel quality indicator (CQI) reference signal in the second part of the MBSFN subframe.

15. A method of receiving information in a wireless communication network, comprising:
receiving, at a station, signaling information indicating that a multicast/broadcast single frequency network (MBSFN) subframe carries unicast information for the station;
receiving a first part of the MBSFN subframe carrying a reference signal sent in accordance with a MBSFN subframe format, wherein the reference signal is sent on a resource element from an antenna and no symbols are sent on the resource element from other antennas;
receiving a second part of the MBSFN subframe carrying unicast information for the station; and
processing the second part of the subframe to recover the unicast information for the station.

16. The method of claim 15, further comprising:
processing the first and second parts of the MBSFN subframe to recover the reference signal, wherein the reference signal is sent from at most four antennas in the first part of the MBSFN subframe and is sent from at least one additional antenna in the second part of the MBSFN subframe.

17. The method of claim 15, further comprising:
processing the second part of the MBSFN subframe to recover a dedicated reference signal sent to the station, wherein the dedicated reference signal and the unicast information are sent with beamforming to the station.

18. The method of claim 15, further comprising:
receiving a channel quality indicator (CQI) reference signal in the second part of the MBSFN subframe; and
estimating channel quality based on the CQI reference signal.

19. An apparatus for wireless communication, comprising:
receiving signaling information indicating that a multicast/broadcast single frequency network (MBSFN) subframe carries unicast information for the apparatus;
means for receiving a first part of the MBSFN subframe carrying a reference signal sent in accordance with a MBSFN subframe format, wherein the reference signal is sent on a resource element from an antenna and no symbols are sent on the resource element from other antennas;
means for receiving a second part of the MBSFN subframe carrying unicast information for the apparatus; and
means for processing the second part of the MBSFN subframe to recover the unicast information for the apparatus.

20. The apparatus of claim 19, further comprising:
means for processing the first and second parts of the MBSFN subframe to recover the reference signal, wherein the reference signal is sent from at most four antennas in the first part of the MBSFN subframe and is sent from at least one additional antenna in the second part of the MBSFN subframe.

21. The apparatus of claim 19, further comprising:
means for processing the second part of the MBSFN subframe to recover a dedicated reference signal sent to the apparatus, wherein the dedicated reference signal and the unicast information are sent with beamforming to the apparatus.

22. The apparatus of claim 19, further comprising:
means for receiving a channel quality indicator (CQI) reference signal in the second part of the MBSFN subframe; and
means for estimating channel quality based on the CQI reference signal.

23. An apparatus for wireless communication, comprising:
at least one processor configured to:
receive signaling information indicating that a multicast/broadcast single frequency network (MBSFN) subframe carries unicast information for the apparatus;
receive a first part of the MBSFN subframe carrying a reference signal sent in accordance with a MBSFN subframe format, wherein the reference signal is sent on a resource element from an antenna and no symbols are sent on the resource element from other antennas;
receive a second part of the MBSFN subframe carrying unicast information for the apparatus; and
process the second part of the MBSFN subframe to recover the unicast information for the apparatus.

24. The apparatus of claim 23, wherein the at least one processor is configured to process the first and second parts of the MBSFN subframe to recover the reference signal, and wherein the reference signal is sent from at most four antennas in the first part of the MBSFN subframe and is sent from at least one additional antenna in the second part of the MBSFN subframe.

25. The apparatus of claim 23, wherein the at least one processor is configured to process the second part of the MBSFN subframe to recover a dedicated reference signal sent to the apparatus, and wherein the dedicated reference signal and the unicast information are sent with beamforming to the apparatus.

26. The apparatus of claim 23, wherein the at least one processor is configured to receive a channel quality indicator (CQI) reference signal in the second part of the MBSFN subframe, and to estimate channel quality based on the CQI reference signal.

27. A computer program product, comprising:
a non-transitory computer-readable medium comprising:
code for causing at least one computer to:
receive signaling information indicating that a multicast/broadcast single frequency network (MBSFN) subframe carries unicast information for a station;
receive a first part of the MBSFN subframe carrying a reference signal sent in accordance with a MBSFN subframe format, wherein the reference signal is sent on a resource element from an antenna and no symbols are sent on the resource element from other antennas;
receive a second part of the MBSFN subframe carrying unicast information for the station; and
process the second part of the MBSFN subframe to recover the unicast information for the station.

28. A method of mitigating interference in a wireless communication network, comprising:
reserving a subframe by a first base station for a second base station;
sending a reference signal in a first part of the reserved subframe in accordance with a multicast/broadcast single frequency network (MBSFN) subframe format, comprising sending the reference signal in first M symbol periods of the reserved subframe, where M is one or greater and is dependent on number of antennas at the first base station; and
sending no transmissions or transmissions at a low transmit power level in a remaining part of the reserved subframe to reduce interference to stations served by the second base station.

29. The method of claim 28, further comprising:
sending system information conveying the reserved subframe as a MBSFN subframe to stations served by the first base station.

30. The method of claim 28, wherein the first base station is a high-power base station and the second base station is a low-power base station.

31. The method of claim 28, wherein the first base station has restricted access and the second base station has restricted or unrestricted access.

32. An apparatus for wireless communication, comprising:
means for reserving a subframe by a first base station for a second base station;
means for sending a reference signal in a first part of the reserved subframe in accordance with a multicast/broadcast single frequency network (MBSFN) subframe format, comprising means for sending the reference signal in first M symbol periods of the reserved subframe, where M is one or greater and is dependent on number of antennas at the first base station; and
means for sending no transmissions or transmissions at a low transmit power level in a remaining part of the reserved subframe to reduce interference to stations served by the second base station.

33. The apparatus of claim 32, further comprising:
means for sending system information conveying the reserved subframe as a MBSFN subframe to stations served by the first base station.

34. A method of sending information in a wireless communication network, comprising:
receiving an indication of a subframe reserved by a first base station for a second base station;
sending no transmissions in a first part of the reserved subframe, the first part comprising a reference signal sent by the first base station in accordance with a multicast/broadcast single frequency network (MBSFN) subframe format; and
sending transmissions in a second part of the reserved subframe to stations served by the second base station, comprising:
sending a reference signal in the second part of the reserved subframe,
sending control information in at least one symbol period in the second part of the reserved subframe, and
sending unicast information in remaining symbol periods in the second part of the reserved subframe to the stations served by the second base station.

35. The method of claim 34, wherein the first part of the reserved subframe comprises M symbol periods, where M is one or greater and is dependent on number of antennas at the first base station.

36. An apparatus for wireless communication, comprising:
means for receiving an indication of a subframe reserved by a first base station for a second base station;
means for sending no transmissions in a first part of the reserved subframe, the first part comprising a reference signal sent by the first base station in accordance with a multicast/broadcast single frequency network (MBSFN) subframe format; and
means for sending transmissions in a second part of the reserved subframe to stations served by the second base station, comprising:
means for sending a reference signal in the second part of the reserved subframe,
means for sending control information in at least one symbol period in the second part of the reserved subframe, and means for sending unicast information in remaining symbol periods in the second part of the reserved subframe to the stations served by the second base station.

37. A method of receiving information in a wireless communication network, comprising:
receiving by a station a subframe reserved by a first base station for a second base station, the subframe comprising a first part and a second part, the first part comprising a reference signal sent by the first base station in accordance with a multicast/broadcast single frequency network (MBSFN) subframe format; and
processing the second part of the subframe to recover unicast information sent by the second base station to the station, comprising:
recovering a reference signal from the second part of the subframe,
recovering control information from at least one symbol period in the second part of the subframe, and
recovering the unicast information from at least one remaining symbol period in the second part of the subframe.

38. The method of claim 37, further comprising:
receiving signaling conveying the subframe as carrying unicast information for the station.

39. The method of claim 37, further comprising:
skipping first M symbol periods of the subframe, where M is one or greater and dependent on number of antennas at the first base station.

40. An apparatus for a wireless communication station, comprising:
means for receiving by a station a subframe reserved by a first base station for a second base station, the subframe comprising a first part and a second part, the first part comprising a reference signal sent by the first base station in accordance with a multicast/broadcast single frequency network (MBSFN) subframe format; and
means for processing the second part of the subframe to recover unicast information sent by the second base station to the station, comprising:
means for recovering a reference signal from the second part of the subframe,
means for recovering control information from at least one symbol period in the second part of the subframe, and
means for recovering the unicast information from at least one remaining symbol period in the second part of the subframe.

41. The apparatus of claim 40, further comprising:
means for receiving signaling conveying the subframe as carrying unicast information for the apparatus.

42. An apparatus for wireless communication, comprising:
at least one processor configured to:
send system information declaring a subframe as a multicast/broadcast single frequency network (MBSFN) subframe;
send signaling to at least one station to indicate that the subframe carries unicast information;
send a reference signal in a first part of the MBSFN subframe in accordance with a MBSFN subframe format, wherein the reference signal is sent on a resource element from an antenna and no symbols are sent on the resource element from other antennas; and
send unicast information in a second part of the MBSFN subframe to the at least one station recognizing the MBSFN subframe as carrying unicast information.

43. A computer program product, comprising:
a non-transitory computer-readable medium comprising:
code for causing at least one computer to:
send system information declaring a subframe as a multicast/broadcast single frequency network (MBSFN) subframe;
send signaling to at least one station to indicate that the subframe carries unicast information;
send a reference signal in a first part of the MBSFN subframe in accordance with a MBSFN subframe format, wherein the reference signal is sent on a resource element from an antenna and no symbols are sent on the resource element from other antennas; and
send unicast information in a second part of the MBSFN subframe to the at least one station recognizing the MBSFN subframe as carrying unicast information.

44. An apparatus for wireless communication, comprising:
at least one processor configured to:
reserve a subframe by a first base station for a second base station;
send a reference signal in a first part of the reserved subframe in accordance with a multicast/broadcast single frequency network (MBSFN) subframe format, comprising sending the reference signal in first M symbol periods of the reserved subframe, where M is one or greater and is dependent on number of antennas at the first base station; and
send no transmissions or transmissions at a low transmit power level in a remaining part of the reserved subframe to reduce interference to stations served by the second base station.

45. A computer program product, comprising:
a non-transitory computer-readable medium comprising:
code for causing at least one computer to reserve a subframe by a first base station for a second base station;
code for causing the at least one computer to send a reference signal in a first part of the reserved subframe in accordance with a multicast/broadcast single frequency network (MBSFN) subframe format, comprising sending the reference signal in first M symbol periods of the reserved subframe, where M is one or greater and is dependent on number of antennas at the first base station; and
code for causing the at least one computer to send no transmissions or transmissions at a low transmit power level in a remaining part of the reserved subframe to reduce interference to stations served by the second base station.

46. An apparatus for wireless communication, comprising:
at least one processor configured to:
receive an indication of a subframe reserved by a first base station for a second base station;
send no transmissions in a first part of the reserved subframe, the first part comprising a reference signal sent by the first base station in accordance with a multicast/broadcast single frequency network (MBSFN) subframe format; and
send transmissions in a second part of the reserved subframe to stations served by the second base station, comprising:
sending a reference signal in the second part of the reserved subframe,
sending control information in at least one symbol period in the second part of the reserved subframe, and sending unicast information in remaining symbol periods in the second part of the reserved subframe to the stations served by the second base station.

47. A computer program product, comprising:
a non-transitory computer-readable medium comprising:
- code for causing at least one computer to receive an indication of a subframe reserved by a first base station for a second base station;
- code for causing the at least one computer to send no transmissions in a first part of the reserved subframe, the first part comprising a reference signal sent by the first base station in accordance with a multicast/broadcast single frequency network (MBSFN) subframe format; and
- code for causing the at least one computer to send transmissions in a second part of the reserved subframe to stations served by the second base station, comprising:
  - sending a reference signal in the second part of the reserved subframe,
  - sending control information in at least one symbol period in the second part of the reserved subframe, and
  - sending unicast information in remaining symbol periods in the second part of the reserved subframe to the stations served by the second base station.

48. An apparatus for wireless communication, comprising:
at least one processor configured to:
- receive by a station a subframe reserved by a first base station for a second base station, the subframe comprising a first part and a second part, the first part comprising a reference signal sent by the first base station in accordance with a multicast/broadcast single frequency network (MBSFN) subframe format; and
- process the second part of the subframe to recover unicast information sent by the second base station to the station, comprising:
  - recovering a reference signal from the second part of the subframe,
  - recovering control information from at least one symbol period in the second part of the subframe, and
  - recovering the unicast information from at least one remaining symbol period in the second part of the subframe.

49. A computer program product, comprising:
a non-transitory computer-readable medium comprising:
- code for causing at least one computer to receive by a station a subframe reserved by a first base station for a second base station, the subframe comprising a first part and a second part, the first part comprising a reference signal sent by the first base station in accordance with a multicast/broadcast single frequency network (MBSFN) subframe format; and
- code for causing the at least one computer to process the second part of the subframe to recover unicast information sent by the second base station to the station, comprising:
  - recovering a reference signal from the second part of the subframe,
  - recovering control information from at least one symbol period in the second part of the subframe, and
  - recovering the unicast information from at least one remaining symbol period in the second part of the subframe.

* * * * *